United States Patent
Stuntebeck

(10) Patent No.: US 12,120,077 B2
(45) Date of Patent: Oct. 15, 2024

(54) SYSTEMS AND METHODS FOR CONTROLLING EMAIL ACCESS

(71) Applicant: AirWatch LLC, Atlanta, GA (US)

(72) Inventor: Erich Stuntebeck, Johns Creek, GA (US)

(73) Assignee: Omnissa, LLC, Palo Alto, CA (US)

( * ) Notice: Subject to any disclaimer, the term of this patent is extended or adjusted under 35 U.S.C. 154(b) by 457 days.

(21) Appl. No.: 16/867,780

(22) Filed: May 6, 2020

(65) Prior Publication Data

US 2020/0267104 A1 Aug. 20, 2020

Related U.S. Application Data

(63) Continuation of application No. 15/875,893, filed on Jan. 19, 2018, now Pat. No. 10,666,591, which is a continuation of application No. 14/687,394, filed on Apr. 15, 2015, now Pat. No. 9,882,850, which is a continuation of application No. 13/750,887, filed on Jan. 25, 2013, now Pat. No. 9,021,037, which is a continuation-in-part of application No. 13/706,499, filed on Dec. 6, 2012, now Pat. No. 8,978,110.

(51) Int. Cl.

| | |
|---|---|
| G06F 15/16 | (2006.01) |
| G06Q 10/107 | (2023.01) |
| H04L 9/40 | (2022.01) |
| H04L 51/212 | (2022.01) |

(52) U.S. Cl.
CPC ......... *H04L 51/212* (2022.05); *G06Q 10/107* (2013.01); *H04L 63/0428* (2013.01); *H04L 63/08* (2013.01); *H04L 63/10* (2013.01); *H04L 63/101* (2013.01)

(58) Field of Classification Search
CPC ... H04L 51/212; H04L 63/0428; H04L 63/08; H04L 63/10; H04L 63/101; G06Q 10/107
USPC .................................. 709/206–207; 713/168
See application file for complete search history.

(56) References Cited

U.S. PATENT DOCUMENTS

| | | | |
|---|---|---|---|
| 4,679,226 A | 7/1987 | Muehleisen | |
| 5,237,614 A | 8/1993 | Weiss | |
| 5,446,888 A | 8/1995 | Pyne | |
| 5,574,786 A | 11/1996 | Dayan et al. | |

(Continued)

FOREIGN PATENT DOCUMENTS

| | | |
|---|---|---|
| CA | 2149337 A1 | 6/1994 |
| GB | 2309860 B | 5/2000 |

(Continued)

OTHER PUBLICATIONS

Asynchrony Software, Inc., , "PDA Defense User Guide", 726, 2002.

(Continued)

*Primary Examiner* — Bharat Barot
(74) *Attorney, Agent, or Firm* — Kim & Stewart LLP

(57) ABSTRACT

Embodiments of the disclosure relate to proxying at least one email resource from at least one email service to at least one client device, determining whether the email resources are accessible to the client devices via at least one unauthorized application on the client devices, and modifying the email resources to be inaccessible via the unauthorized applications on the client devices in response to a determination that the email resources are accessible via the unauthorized applications on the client devices.

20 Claims, 17 Drawing Sheets

(56) References Cited

U.S. PATENT DOCUMENTS

| | | |
|---|---|---|
| 5,625,869 A | 4/1997 | Nagamatsu et al. |
| 5,631,947 A | 5/1997 | Wittstein et al. |
| 5,799,068 A | 8/1998 | Kikinis et al. |
| 5,826,265 A | 10/1998 | Van Huben et al. |
| 5,864,683 A | 1/1999 | Boebert et al. |
| 5,870,459 A | 2/1999 | Phillips et al. |
| 5,928,329 A | 7/1999 | Clark et al. |
| 5,961,590 A | 10/1999 | Mendez et al. |
| 5,966,081 A | 10/1999 | Chesnutt |
| 5,974,238 A | 10/1999 | Chase, Jr. |
| 5,987,609 A | 11/1999 | Hasebe |
| 6,006,332 A | 12/1999 | Rabne et al. |
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,463,470 B1 | 10/2002 | Mohaban et al. |
| 6,480,096 B1 | 11/2002 | Gutman et al. |
| 6,560,772 B1 | 5/2003 | Slinger |
| 6,606,662 B2 | 8/2003 | Nagasaki |
| 6,636,489 B1 | 10/2003 | Fingerhut |
| 6,668,322 B1 | 12/2003 | Wood et al. |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,963,971 B1 * | 11/2005 | Bush .................. H04L 63/0428 |
| | | 713/153 |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,054,905 B1 * | 5/2006 | Hanna .................. G06Q 10/107 |
| | | 709/206 |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,191,508 B2 | 3/2007 | Hwang et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,347,752 B2 | 3/2008 | Morvillo |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,383,438 B2 * | 6/2008 | Fahrny .............. H04N 21/26291 |
| | | 713/169 |
| 7,400,428 B2 | 7/2008 | Yoshida |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,480,907 B1 | 1/2009 | Marolia et al. |
| 7,496,847 B2 | 2/2009 | Koehane et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,662,125 B2 | 2/2010 | Rucinski |
| 7,665,118 B2 | 2/2010 | Mann et al. |
| 7,665,125 B2 | 2/2010 | Heard et al. |
| 7,685,645 B2 | 3/2010 | Doyle et al. |
| 7,686,545 B2 | 3/2010 | Hedrick |
| 7,698,269 B2 | 4/2010 | Zhou et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,873,959 B2 | 1/2011 | Zhu et al. |
| 7,890,091 B2 | 2/2011 | Puskoor et al. |
| 7,912,896 B2 | 3/2011 | Wolovitz et al. |
| 7,914,641 B2 | 3/2011 | Yamamoto et al. |
| 7,917,641 B2 | 3/2011 | Crampton |
| 7,970,386 B2 | 6/2011 | Bhat et al. |
| 7,984,513 B1 * | 7/2011 | Kyne ...................... G06F 21/10 |
| | | 713/151 |
| 8,001,082 B1 | 8/2011 | Alexander |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,086,957 B2 | 12/2011 | Bauchot et al. |
| 8,094,591 B1 | 1/2012 | Hunter et al. |
| 8,099,332 B2 | 1/2012 | Lemay et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,225,381 B2 | 7/2012 | Lemke |
| 8,359,016 B2 | 1/2013 | Lindeman et al. |
| 8,433,620 B2 | 4/2013 | Futty et al. |
| 8,504,831 B2 | 8/2013 | Pratt et al. |
| 8,521,821 B2 * | 8/2013 | van der Horst ..... H04L 63/0428 |
| | | 709/206 |
| 8,713,646 B2 | 4/2014 | Stuntebeck |
| 8,826,432 B2 | 9/2014 | Dabbiere et al. |
| 8,832,785 B2 | 9/2014 | Stuntebeck et al. |
| 8,972,590 B2 | 3/2015 | Haghpassand |
| 8,978,110 B2 | 3/2015 | Dabbiere et al. |
| 9,384,360 B2 * | 7/2016 | Lim ......................... H04L 63/10 |
| 9,847,977 B2 * | 12/2017 | Freeman ............. H04L 63/0442 |
| 10,380,568 B1 * | 8/2019 | Rogers ............... G06Q 20/1235 |
| 2002/0013721 A1 | 1/2002 | Dabbiere et al. |
| 2002/0049644 A1 | 4/2002 | Kargman |
| 2002/0055967 A1 | 5/2002 | Coussement |
| 2002/0098840 A1 | 7/2002 | Hanson et al. |
| 2002/0194292 A1 | 12/2002 | King |
| 2003/0033283 A1 | 2/2003 | Evans et al. |
| 2003/0033541 A1 | 2/2003 | Edmark et al. |
| 2003/0061515 A1 | 3/2003 | Kindberg et al. |
| 2003/0065934 A1 | 4/2003 | Angelo et al. |
| 2003/0110084 A1 | 6/2003 | Eberhard et al. |
| 2003/0110397 A1 | 6/2003 | Supramaniam et al. |
| 2003/0172166 A1 | 9/2003 | Judge et al. |
| 2003/0186689 A1 | 10/2003 | Herle et al. |
| 2003/0187798 A1 | 10/2003 | Mckinley et al. |
| 2003/0204716 A1 | 10/2003 | Rockwood et al. |
| 2003/0233410 A1 | 12/2003 | Gusler et al. |
| 2004/0006615 A1 | 1/2004 | Jackson |

(56) References Cited

U.S. PATENT DOCUMENTS

| | | |
|---|---|---|
| 2004/0006706 A1 | 1/2004 | Erlingsson |
| 2004/0054779 A1 | 3/2004 | Takeshima et al. |
| 2004/0098715 A1 | 5/2004 | Aghera et al. |
| 2004/0123153 A1 | 6/2004 | Wright et al. |
| 2004/0133520 A1 | 7/2004 | Callas et al. |
| 2004/0181687 A1 | 9/2004 | Nachenberg et al. |
| 2004/0224703 A1 | 11/2004 | Takaki et al. |
| 2004/0260821 A1 | 12/2004 | Yamamoto et al. |
| 2005/0003804 A1 | 1/2005 | Huomo et al. |
| 2005/0060643 A1 | 3/2005 | Glass et al. |
| 2005/0071748 A1 | 3/2005 | Shipp |
| 2005/0228990 A1 | 10/2005 | Kato et al. |
| 2005/0246192 A1 | 11/2005 | Jauffred et al. |
| 2005/0257261 A1 | 11/2005 | Shraim et al. |
| 2005/0273629 A1 | 12/2005 | Abrams et al. |
| 2006/0031407 A1 | 2/2006 | Dispensa et al. |
| 2006/0190984 A1 | 8/2006 | Heard et al. |
| 2006/0224742 A1 | 10/2006 | Shahbazi |
| 2006/0224842 A1 | 10/2006 | Suto et al. |
| 2006/0288220 A1 | 12/2006 | Pennington et al. |
| 2007/0016613 A1 | 1/2007 | Foresti et al. |
| 2007/0033397 A1 | 2/2007 | Phillips, II et al. |
| 2007/0093243 A1 | 4/2007 | Kapadekar et al. |
| 2007/0136207 A1 | 6/2007 | Davydov et al. |
| 2007/0136235 A1 | 6/2007 | Hess |
| 2007/0136492 A1 | 6/2007 | Blum et al. |
| 2007/0143603 A1 | 6/2007 | Hadden et al. |
| 2007/0156897 A1 | 7/2007 | Lim |
| 2007/0174433 A1 | 7/2007 | Mendez et al. |
| 2007/0192588 A1 | 8/2007 | Roskind et al. |
| 2007/0260883 A1 | 11/2007 | Giobbi et al. |
| 2007/0261009 A1 | 11/2007 | Granicher et al. |
| 2007/0261099 A1 | 11/2007 | Broussard et al. |
| 2007/0271608 A1 | 11/2007 | Shimizu et al. |
| 2007/0283430 A1 | 12/2007 | Lai et al. |
| 2007/0288637 A1 | 12/2007 | Layton et al. |
| 2007/0294416 A1 | 12/2007 | Agre et al. |
| 2008/0010348 A1 | 1/2008 | Dawson et al. |
| 2008/0046983 A1 | 2/2008 | Lester et al. |
| 2008/0051076 A1 | 2/2008 | O'Shaughnessy et al. |
| 2008/0098237 A1* | 4/2008 | Dung ................ H04L 63/0428 |
| | | 713/189 |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0187140 A1 | 8/2008 | McGillian et al. |
| 2008/0201453 A1 | 8/2008 | Assenmacher |
| 2008/0267144 A1 | 10/2008 | Jano et al. |
| 2009/0030884 A1 | 1/2009 | Pulfer et al. |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0217370 A1 | 8/2009 | Hulten et al. |
| 2009/0248808 A1 | 10/2009 | Izumi et al. |
| 2009/0253410 A1 | 10/2009 | Fitzgerald et al. |
| 2009/0260064 A1 | 10/2009 | McDowell et al. |
| 2009/0292984 A1 | 11/2009 | Bauchot et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0050243 A1 | 2/2010 | Hardt |
| 2010/0061356 A1 | 3/2010 | Qvarfordt et al. |
| 2010/0100641 A1 | 4/2010 | Quinlan et al. |
| 2010/0114941 A1 | 5/2010 | Von Kaenel et al. |
| 2010/0120450 A1 | 5/2010 | Herz |
| 2010/0125897 A1 | 5/2010 | Jain et al. |
| 2010/0144323 A1 | 6/2010 | Collins et al. |
| 2010/0146269 A1 | 6/2010 | Baskaran |
| 2010/0235918 A1 | 9/2010 | Mizrahi et al. |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0318623 A1 | 12/2010 | Bloch et al. |
| 2011/0004941 A1 | 1/2011 | Mendez et al. |
| 2011/0040978 A1 | 2/2011 | Tsao |
| 2011/0047169 A1 | 2/2011 | Leighton et al. |
| 2011/0082900 A1 | 4/2011 | Nagpal et al. |
| 2011/0092221 A1* | 4/2011 | Zubas ................ H04L 51/212 |
| | | 455/466 |
| 2011/0113062 A1 | 5/2011 | Quinlan et al. |
| 2011/0131408 A1 | 6/2011 | Cook et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0167492 A1 | 7/2011 | Ghosh et al. |
| 2011/0202589 A1 | 8/2011 | Piernot et al. |
| 2011/0202987 A1 | 8/2011 | Bauer-Hermann et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296166 A1 | 12/2011 | Hesse et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0023573 A1 | 1/2012 | Shi |
| 2012/0102392 A1 | 4/2012 | Reesman et al. |
| 2012/0198547 A1 | 8/2012 | Fredette et al. |
| 2012/0204032 A1 | 8/2012 | Wilkins et al. |
| 2012/0221955 A1 | 8/2012 | Raleigh et al. |
| 2012/0278620 A1 | 11/2012 | Singh et al. |
| 2013/0061307 A1 | 3/2013 | Livne |
| 2013/0086466 A1 | 4/2013 | Levy et al. |
| 2013/0097421 A1 | 4/2013 | Lim |
| 2013/0152169 A1 | 6/2013 | Stuntebeck |
| 2013/0219256 A1 | 8/2013 | Lloyd et al. |
| 2013/0227397 A1 | 8/2013 | Tvorun |
| 2014/0020072 A1 | 1/2014 | Thomas |
| 2014/0022050 A1 | 1/2014 | Dua et al. |
| 2014/0053059 A1 | 2/2014 | Weber et al. |

FOREIGN PATENT DOCUMENTS

| | | |
|---|---|---|
| GB | 2346716 A | 8/2000 |
| JP | H07141245 A | 6/1995 |
| JP | H08251660 A | 9/1996 |
| WO | 9704389 A1 | 2/1997 |
| WO | 9922322 A1 | 5/1999 |
| WO | 0241661 A2 | 5/2002 |

OTHER PUBLICATIONS

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726.

Menaria, Pankaj et al., "Security in Mobile Database Systems", 707, 726, Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

Gong, Li et al., "Multicast Security and Its Extension to a Mobile Environment", Oct. 1995.

Infinite Technologies, , "Infinite Interchange", 1997.

Kiiskinen, Jani et al., "Data Channel Service for Wireless Telephone Links", Jan. 1996.

(56) References Cited

OTHER PUBLICATIONS

Latedroid, , "JuiceDefender", Jan. 15, 2012.
Nokia, , "Nokia 9000i Owner's Manual", 1997.
Ratner, David et al., "Replication Requirements in Mobile Environments", Nov. 2001.
Ratner, David H. , "Roam: A scalable Replication System for Mobile and Distributed Computing", Jan. 1998.
Research in Motion, , "Blackberry Wireless Handheld 5810 Getting Started Guide", Jan. 15, 2003.
Research in Motion, , "Blackberry Wireless Handheld 5810 Quick Reference Guide", 2003.
Research in Motion, , "Blackberry Wireless Handheld 5810 User Guide", 2003.
Stajano, Frank et al., "The Thinnest of Clients: Controlling It All via Cellphone", Mobile Computing and Communications Review, vol. 2, No. 4, Oct. 1998.
Sybase, , "Mobilink Synchronization User's Guide", Part No. 38132-01-0800-01, Nov. 2001.
Symantec Corporation, , "Creating Norton pcAnywhere Scripts", 1994.
Traveling Software, Inc., , "Laplink for Windows 95", 1996.
Wachowicz, Moniza et al., "Combining Location and Data Management in an Environment for Total Mobility", In Proceedings of the International Workshop on Information Visualization and Mobile Computing, 1996.
Kcellenet, Inc., , "RemoteWare Client for Windows NT and Windows 95 User's Guide", 1996.
Xcellenet, Inc., , "RemoteWare Forms and RemoteWare Query", 1994.
Xcellenet, Inc., , "RemoteWare Forms Getting Started Guide", 1994.
Kcellenet, Inc., , "RemoteWare Server for Windows NT Administrator's Guide", 1996.
Kcellenet, Inc., , "RemoteWare Server for Windows NT Reference Manual", 1996.
Kcellenet, Inc., , "RemoteWare Server Operations Guide", 1992.
IP.com search results, Jun. 18, 2014.

\* cited by examiner

SYSTEMS AND METHODS FOR CONTROLLING EMAIL ACCESS

CROSS-REFERENCE TO RELATED APPLICATIONS

This application is a continuation of U.S. application Ser. No. 15/875,893, filed Jan. 19, 2018, which is a continuation of U.S. application Ser. No. 14/687,394, filed Apr. 15, 2015, which has issued as U.S. Pat. No. 9,882,850, which is a continuation of U.S. application Ser. No. 13/750,887, filed Jan. 25, 2013, which has issued as U.S. Pat. No. 9,021,037, which is a continuation-in-part of U.S. application Ser. No. 13/706,499, filed on Dec. 6, 2012, which has issued as U.S. Pat. No. 8,978,110, the contents of both of which are hereby expressly incorporated by reference in their entireties.

FIELD OF THE INVENTION

Embodiments of the disclosure relate generally to data security, and more particularly, to systems and methods for controlling email access.

BACKGROUND

Controlling email access is critical to ensure that email resources may only be accessed by authorized parties in authorized manners. To date, enterprises have utilized access credentials to control which, if any, parties may access email resources. This method may ensure that only authorized parties may access email resources. However, this method fails to control how those email resources may be accessed by the proper recipients. This method further fails to modify the email resources to comply with enterprise security standards. As enterprises seek to protect sensitive information, systems and methods for controlling email access are necessary to ensure that email resources may only be accessed by authorized parties in authorized manners.

BRIEF SUMMARY

Some or all of the above needs and/or problems may be addressed by certain embodiments of the disclosure. Certain embodiments may include systems and methods for controlling access to networks. According to one embodiment of the disclosure, there is disclosed a system. The system can include at least one client device. The system can also include at least one email service. The system can further include at least one memory that stores computer-executable instructions. The system can yet further include a processor configured to access the at least one memory. The processor is configured to execute the computer-executable instructions to perform a method including the steps of proxying email resources from email services to client devices, determining whether the email resources are accessible via unauthorized applications on the client devices, and configuring the email resources to be inaccessible via unauthorized applications on the client devices in response to a determination that the email resources are accessible via unauthorized applications on the client devices.

According to another embodiment of the disclosure, there is disclosed a method. The method can include identifying email resources on client devices, determining whether the email resources are accessible via unauthorized applications on the client devices, and configuring the email resources to be inaccessible via unauthorized applications on the client devices in response to a determination that the email resources are accessible via unauthorized applications on the client devices.

Further, according to another embodiment of the disclosure, there is disclosed a non-transitory computer-readable medium embodying a program executable in a computing device, the program comprising code that, when executed by a computing device, causes the computing device to perform a method comprising the steps of identifying email resources, determining whether the email resources are accessible via unauthorized applications on client devices, and configuring the email resources to be inaccessible via unauthorized applications on client devices in response to a determination that the email resources are accessible via unauthorized applications on client devices.

Other embodiments, systems, methods, apparatus aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, controlling access to email. As an overview, access to email may be controlled by limiting access of proper recipients to specific email resources and by limiting the manner in which the proper recipients access the specific email resources. In certain embodiments, the email resources may be modified to satisfy enterprise security standards and/or access restrictions.

The technical effects of certain embodiments of the disclosure may include preventing unauthorized access to email resources and eliminating costs associated with sensitive information loss. Moreover, the technical effects of certain embodiments of the invention may include modifying email resources to satisfy access restrictions.

Figure 1:
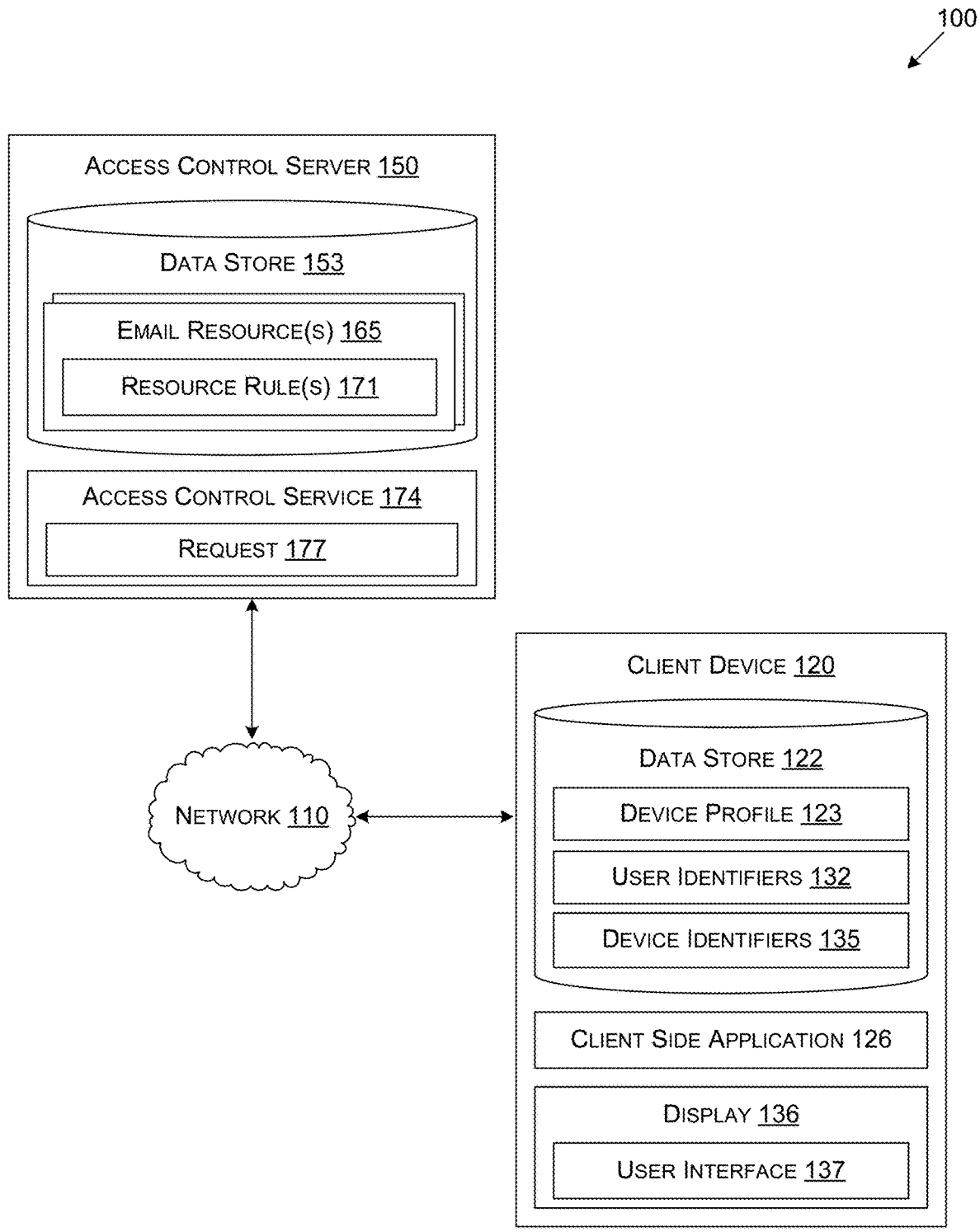
FIG. 1 illustrates a block diagram of a networked environment according to certain embodiments of the disclosure.

FIG. 1 depicts certain illustrative components for a networked environment 100 according to various embodiments. In certain embodiments, the networked environment 100 may include a network 110, a client device 120, and an access control server 150. In some embodiments, the network 110 may be or include, for example, any type of wireless network such as a wireless local area network (WLAN), a wireless wide area network (WWAN), and/or the like. Additionally, the network 110 may be or include the Internet, intranets, extranets, microwave networks, satellite communications, cellular systems, PCS, infrared communications, global area networks, and/or any combination of two or more such networks. In one embodiment, the network 110 facilitates access to email resources 165 for at least one client device 120, where access to the email resources 165 is controlled by an access control server 150.

The client device 120 may comprise, for example, a cellular telephone, a smartphone and/or personal digital assistant, a tablet computer and/or web pad, a laptop computer, a desktop computer, a set-top box, a music player, a game console, and/or another device with like capability. For purposes of convenience, the client device 120 is referred to herein in the singular. Even though the client device 120 is referred to in the singular, it is understood that at least one client device 120 may be employed in the arrangements as descried herein.

The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 may be operable to communicate via wired connection with the access control server 150 with the aid of the wired network connectivity component. The client device 120 may be further operable to communicate wirelessly with the access control server 150 with the aid of the wireless network connectivity component.

The client device 120 may comprise a memory for storing data and applications, a processor for executing applications stored in memory, a display 136 upon which the processor may execute at least one user interface 137, and a local interface such as a bus, as will be described with respect to FIG. 12. The memory of the client device 120 may comprise a data store 122. The data store 122 of the client device 120 may include a device profile 123. In one embodiment, the device profile 123 may represent hardware, software, and security attributes that describe the state of the client device 120. For instance, the device profile 123 may represent hardware specifications of the client device 120, version and configuration information of various software programs and hardware components installed on the client device 120, transport protocols enabled on the client device 120, version and usage information of various other resources stored on the client device 120, and/or any other attributes associated with the state of the client device 120. In another embodiment, the device profile 123 may further include characteristics describing the state of the client device 120, including indications of the location of the client device 120, the current time associated with the client device 120, the client device's 120 detection of at least one network beacon associated with at least one network 110, and the signal strength of the network beacons received by the client device 120. In yet another embodiment, the device profile 123 may include data indicating a date of a last virus scan of the client device 120, a date of a last access and/or service by an Information Technology (IT) representative, a date of a last access by an access control service 174, and/or any other data indicating a date of last maintenance of the client device 120.

Additionally, the data store 122 of the client device 120 may include at least one user identifier 132. The user identifiers 132 may uniquely identify the user of the client device 120. In one embodiment, the user identifiers 132 may include a username, a password, and/or biometric data related to facial recognition, retina recognition, fingerprint recognition, and the like. Similarly, the data store 122 of the client device 120 may include at least one device identifier 135. The device identifiers 135 may uniquely identify the client device 120. In one embodiment, the device identifiers 135 may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. In another embodiment, the device identifier 135 may be a unique software identifier such a token or certificate, based at least in part on the aforementioned unique hardware identifiers.

The client device 120 may be configured to execute various applications. For example, the client device 120 may be configured to execute applications such as secure container applications, web browsing applications, email applications, instant messaging applications, word processing applications and/or other applications capable of receiving and/or rendering resources 165 on a display 136 associated with the client device 120. Any application capable of receiving and/or rendering resources 165 on a display 136 of the client device 120 is generally referred to herein as a "client side application" 126. The client side application 126 may be stored in the memory of the client device 120. In one embodiment, the client side application 126 may be a secure container application that may be authorized to receive and render resources 165 in accordance with at least one resource rule 171, as described herein. The client side application 126 may include a cryptographic key to decrypt email resources 165 ted with a cryptographic key in order to prevent unauthorized access to the email resources 165. For instance, the client side application 126 may have a cryptographic key that may be capable of decrypting email resources 165 transmitted in an encrypted format to the client device 120 by an access control service 174 executed by an access control server 150.

The client side application 126 may be executed to transmit at least one request 177 to access at least one email resource 165. In certain embodiments, the client side application 126 may transmit requests 177 to an access control service 174. In some embodiments, the requests 177 may include a listing of specific email resources 165 the client device 120 seeks to access. In other embodiments, the requests 177 may include an indication that the client device 120 seeks access to email resources 165 associated with the client device 120, such as email resources 165 addressed to the user of the client device 120. In any instance, the requests 177 may include data from the data store 122 of the client device 120 that may assist an access control service 174 in determining whether the client device 120 is authorized to access the email resources 165. In one embodiment, the request 177 may include the device profile 123 associated with the client device 120. In another embodiment, the request 177 may include user identifiers 132 associated with the client device 120. In yet another embodiment, the request 177 may include device identifiers 135 associated with the client device 120.

The client side application 126 may be further executed to receive an indication that the client device 120 is authorized to access the email resources 165. In certain embodiments, the client side application 126 may receive an authorization indication from an access control service 174 executed by an access control server 150. In some embodiments, the authorization indication may specify which, if any, email resources 165 that the client device 120 is authorized to access and may specify the manner in which the client device 120 may access such email resources 165. In one embodiment, the authorization indication may specify that the client device 120 is authorized to access the email resources 165 while the client device 120 is located within at least one authorized location. In another embodiment, the authorization indication may specify that the client device 120 is authorized to access the email resources 165 while the current time associated with the client device 120 is within at least one authorized window. In yet another embodiment, the authorization indication may specify that the client device 120 is authorized to access the email resources 165 while the client device 120 is communicatively connected to at least one network 110 and/or at least one network beacon associated with the networks 110, as described in application Ser. No. 13/656,046 entitled "SYSTEMS AND METHODS FOR CONTROLLING NETWORK ACCESS," which is incorporated herein by reference in the entirety.

The client side application 126 may be further executed to receive at least one email resource 165. In certain embodiments, the client side application 126 may receive email resources 165 from an access control service 174 executed by an access control server 150. In some embodiments, the client side application 126 may receive email resources 165 from an enterprise email service, such as Microsoft Exchange, Lotus Notes, Novell Groupwise, Zimbra, or the like. In other embodiments, the client side application 126 may receive email resources 165 from a distribution service executed by a distribution server, as described in application Ser. Nos. 13/396,356 and 13/623,627 both entitled "CONTROLLING DISTRIBUTION OF RESOURCES ON A NETWORK," which are incorporated herein by reference in their entirety.

In any instance, the email resources 165 may include various types of electronic data, such as email messages and email attachments. In certain embodiments, the email messages may include text and/or formatting in email headers, email sender fields, email recipient fields, email subject fields, email bodies, email signatures, and/or email footers. Additionally, the email attachments may include settings-type attachments, applications-type attachments, and content-type attachments. In one embodiment, settings-type attachments may include hardware settings, software settings, and/or the like that configure the functionality provided by the client device 120. In another embodiment, application-type attachments may include book applications, business applications, catalogue applications, education applications, entertainment applications, finance applications, food and drink applications, games applications, health and fitness applications, lifestyle applications, medical applications, music applications, navigation applications, news applications, newsstand applications, photo and video applications, productivity applications, reference applications, social networking applications, sports applications, travel applications, utility applications, weather applications, and/or the like. In yet another embodiment, content-type attachments may include application content, video content, image content, audio content, text content, word processor content, presentation content, spreadsheet content, database content, compressed folder content, disk image content, encoded content, backup content, web content, page layout content, plug-in content, font content, system content, developer content, data content and/or the like.

The client side application 126 may be similarly executed to receive at least one resource rule 171 associated with the email resources 165. In certain embodiments, the resource rules 171 may regulate user of and/or access to the email resources 165. In some embodiments, the resource rules 171 may include format rules, content rules, attachment rules, and/or access rules. In one embodiment, the format-type resource rules 171 may specify at least one of required, permitted, and/or prohibited formats of the email resources 165. For example, a format-type resource rule 171 may specify that all email resources 165 must be encoded with AES-256 bit encryption. In another embodiment, the content-type resource rules 171 may specify at least one of required, permitted, and/or prohibited content of the email resources 165. For instance, a content-type resource rule 171 may specify that any email resources 165 containing the text "confidential" must be transmitted utilizing a secure transmission protocol, such as the HTTPS/SSL transmission protocol. In yet another embodiment, the attachment-type resource rules 171 may specify at least one of required, permitted, and/or prohibited attachments to the email resources 165. For example, an attachment-type resource rule 171 may specify that attachments to the email resources 165 must be stripped from the email resources 165. In yet a further embodiment, the access-type resource rules 171 may specify at least one of required, permitted, and/or prohibited access to the email resources 165. For instance, an access-type resource rule 171 may specify that the email resources 165 must be configured to be exclusively accessible via a secure container application, such as the client side application 126. Furthermore, the various types of resource rules 171 may be combined to establish granular access rights. For example, a combination of resource rules 171 may specify required file formats, encryption protocols, body and/or attachment components, and authorized applications associated with the email resources 165.

In some embodiments, the resource rules 171 may be metadata and/or other indications that describe the email resources 165. In particular, the resources rules 171 may specify categories/sub-categories to which the email resources 165 belong, that the email resources 165 are considered favorites, the ownership of the email resources 165, the managing party of the email resources 165, that the email resources 165 are confidential, that the email resources 165 are password protected, the historical version of the email resources 165, at least one description of the email resources 165, at least one comment regarding the email resources 165, the size and format of the email resources 165, the download priority associated with the email resources 165, an expiration date associated with the email resources 165, at least one effective date associated with the email resources 165, and/or the like.

In other embodiments, the resource rules 171 associated with the email resources 165 may change based on the state of the client device 120. In certain embodiments, the stringency of the resource rules 171 may be increased, reduced, and/or eliminated based on the state of the client device 120. In one embodiment, the stringency of the resource rules 171 may be increased, reduced, and/or eliminated if the client device 120 is located within the transmission range of certain network beacons and/or certain networks 110 associated with such network beacons. In another embodiment, the stringency of the resource rules 171 may be increased, reduced, and/or eliminated if the client device 120 is located within at least one location. In yet another embodiment, the stringency of the resource rules 171 may be increased, reduced, and/or eliminated if the current time associated with the client device 120 is within at least one time window. In yet a further embodiment, the stringency of the resource rules 171 may be increased, reduced, and/or eliminated if the client device 120 has previously satisfied the resource rules 171.

Additionally, the client side application 126 may be executed to determine whether the client device 120 is authorized to access the email resources 165. In certain embodiments, the client side application 126 may determine whether the resource rules 171 associated with the email resources 165 are satisfied by the email resources 165. For instance, the client side application 126 may determine that the client device 120 is authorized to access the email resources 165 if the email resources 165 are configured to be inaccessible via certain unauthorized applications and are configured to be accessible via certain authorized applications, as may be specified by an administrator associated with the email resources 165. In some embodiments, the client side application 126 may determine whether the client device is authorized based at least in part on at least one of the device profile 123, user identifiers 132, or device identifiers 135.

The client side application 126 may be further executed to modify the email resources 165. In certain embodiments, the client side application 126 may modify the email resources 165 in response to a determination that the email resources 165 do not satisfy the resource rules 171 associated with the email resources 165. In particular, the client side application 126 may modify the email resources 165 so that the email resources 165 satisfy the resource rules 171 associated with the email resources 165, such as by configuring the email resources 165 to be inaccessible via certain unauthorized applications. In some embodiments, the client side application 126 may modify at least one portion of the email resources 165. In other embodiments, the client side application 126 may modify all portions of and/or the entirety of the email resources 165.

In any instance, the client side application 126 may modify the email resources 165 by formatting, encoding, encrypting, configuring, adding, removing, stripping, moving, replacing and/or flagging portions of the email resources 165. In one embodiment, the client side application 126 may modify the email resources 165 by formatting the email resources 165 into HyperText Markup Language (HTML), Rich Text, Plain Text, and/or other formats. In another embodiment, the client side application 126 may modify the email resources 165 by encoding the email resources 165 using Advanced Encryption Standard (AES), Data Encryption Standard (DES), and/or other encryption protocols. In yet another embodiment, the client side application 126 may modify the email resources 165 by configuring the email resources 165 to be exclusively accessible via at least one secure container application, such as the client side application 126. In yet a further embodiment, the client side application 126 may modify the email resources 165 by adding portions to and/or or removing portions from the email resources 165, for instance, by adding or removing an email signature.

Additionally, in an exemplary embodiment, the client side application 126 may modify the email resources 165 by removing portions of the email resources 165 and configuring the removed portions of the email resources 165 to be exclusively accessible via a secure container application, such as the client side application 126. For example, the client side application 126 may remove attachments from the email resources 165 and may encrypt the removed attachments based at least in part on at least one cryptographic key accessible to the client side application 126. Additionally, the client side application 126 may encrypt the email resources 165 as a whole, thereby preventing the email resources 165 from being accessible via certain unauthorized applications on the client device 120 that an administrator has identified as problematic and/or insecure, while providing access to the email resources 165 via certain authorized applications. In another embodiment, the client side application 126 may modify the email resources 165 by performing at least one of decrypting the email resources 165, re-encrypting the email resources 165, digitally signing email resources 165, or digitally re-signing email resources 165. In yet another embodiment, the client side application 126 may modify the email resources 165 by moving certain portions of the email resources 165, such as by moving a photograph from the body of the email resources 165 to the attachments of the email resources 165. In yet a further embodiment, the client side application 126 may modify the email resources 165 by replacing certain portions of the email resources 165, such as replacing misspelled text with the properly spelled text. In even yet a further embodiment, the client side application 126 may modify the email resources 165 by flagging the email resources 165 as having been modified, such as by attaching an indication to the email resources 165 that provides information related to the modification of the email resources 165.

The client side application 126 may be yet further executed to access at least one email resource 165. In certain embodiments, the client side application 126 may access the email resources 165 received from an access control service 174 and/or another distribution service. In some embodiments, the client side application 126 may access the email resources 165 on the client device 120 in accordance with the resource rules 171. For example, the client side application 126 may determine that the email resources 165 may not be accessed by the client device 120 because the client device 120 is not located within an authorized location specified by the resource rules 171 associated with the email resources 165.

In any instance, the client side application 126 may access the email resources 165 on the client device 120 by storing, installing, activating, decrypting, confirming digital signatures, rendering and/or executing the email resources 165 on the client device 120. In one embodiment, the client side application 126 may store the email resources 165 on the client device 120 by placing the email resources 165 in the data store 122 of the client device 120. In another embodiment, the client side application 126 may install the email resources 165 on the client device 120 by placing the email resources 165 in the data store 122 of the client device 120 and by disabling and/or removing any files that conflict with the email resources 165. In yet another embodiment, the client side application 126 may activate the email resources 165 on the client device 120 by placing the email resources 165 in the data store 122 of the client device 120, by disabling and/or removing any files that conflict with the email resources 165, and by instructing the client device 120 to conform its operations to the email resources 165. In yet a further embodiment, the client side application 126 may decrypt the email resources 165 and/or confirm the digital signature of the email resources 165 to provide the client device 120 with access to the email resources 165. Additionally, the client side application 126 may call on other applications and/or services available to the client device 120, which may be associated with the email resources 165.

In yet a further embodiment, the client side application 126 may render the email resources 165 on the client device 120 by presenting the email resources 165 in a user interface 137 executed on the display 136 of the client device 120. In particular, the client side application 126 may render the email resources 165 in a user interface 137 by decompressing compressed files and presenting the uncompressed files, decrypting encrypted files and presenting the decrypted files, confirming the digital signature of files and presenting the confirmed files, mounting disk image files and presenting the mounted image files, running executable files and presenting the executed files, by enabling a data search of the email resources 165 and presenting the featured output in a user interface 137, by calling on another application on the client device 120 to respond to data links contained within the email resources 165, and/or by transmitting a part or the whole of the email resources 165 to another application on the client device 120. The client side application 126 may render a single email resource 165 or a series of email resources 165 in a comprehensive manner, such as presenting image files in a slideshow-style presentation, and may further render an environment that displays an array of email resources 165 in a single view, such as a category-based tree or outline format. Additionally, in an exemplary embodiment, the client side application 126 may execute the email resources 165 by placing the email resources 165 in the data store 122 of the client device 120, by disabling and/or removing any files that conflict with the email resources 165, and by instructing the client device 120 to perform the operations of the email resources 165.

In certain embodiments, the client side application 126 may be a secure container application that is configured to protect the email resources 165 from unauthorized access. In some embodiments, the client side application 126 may be configured to protect email resources 165 that have been received from an access control service 174. In one embodiment, the client side application 126 may be executed to enforce the resource rules 171 and/or other metadata associated with the email resources 165. For instance, the client side application 126 may prohibit cutting, copying, pasting, transmitting, emailing, text messaging, screen capturing, and/or otherwise manipulating the email resources 165 while the email resources 165 are accessed by the client side application 126. In another embodiment, the client side application 126 may prohibit other applications on the client device 120 and/or other services accessible to the client device 120 from accessing the email resources 165. In particular, the client side application 126 may monitor the data stream between the network 110 and the client device 120, may block any access attempts by another application and/or service, may proxy the email resources 165, and may present the proxied email resources 165 in a user interface 137 rendered by the client side application 126.

The access control server 150 may comprise, for example, a server computer or any other system providing access control capability. Alternatively, a plurality of access control servers 150 may be employed that are arranged, for example, in at least one server bank or computer bank or other arrangements. For example, a plurality of access control servers 150 together may comprise a cloud computing resource, a grid computing resource, and/or any other distributed computing arrangement. Such access control servers 150 may be located in a single installation or may be distributed among many different geographic locations. For purposes of convenience, the access control server 150 is referred to herein in the singular. Even though the access control server 150 is referred to in the singular, it is understood that a plurality of access control servers 150 may be employed in the arrangements as descried herein.

The access control server 150 may comprise a memory for storing data and applications and a processor for executing applications stored in memory, as will be described with respect to FIG. 12. The memory of the access control server 150 may comprise a data store 153. The data store 153 may be representative of at least one data store. The data store 153 may contain certain data that is accessible to the access control server 150. In particular, the data store 153 may contain at least one email resource 165 and at least one resource rule 171 associated with the email resources 165, as described herein. The data in the data store 153 may be associated with the operation of certain applications and/or functionalities executed by the access control server 150. The data store 153 may utilize strong encryption standards to protect the email resources 165 from unauthorized access. For example, the data store 153 may utilize AES (Advanced Encryption Standard) or a similar strong encryption standard commonly utilized for server-side data storage.

The access control server 150 may execute certain applications and/or functionalities such the access control service 174, as well as other applications, services, processes, systems, engines, or functionality not disclosed in detail herein. The access control service 174 may be executed to control email access. In particular, the access control service 174 may limit access to at least one email resource 165 to at least one client device 120 that is authorized to access the email resources 165. The access control service 174 may be further executed to modify at least one email resource 165 so that the email resources 165 satisfy at least one resource rule 171 associated with the email resources 165. The access control service 174 may yet be further executed to distribute at least one email resource 165 to at least one client device 120 that is authorized to access the email resources 165.

The access control service 174 may be executed to control access to at least one email resource 165. In certain embodiments, the access control service 174 may be executed to determine whether at least one client device 120 is authorized to access the email resources 165. In some embodiments, the client side application 126 may determine whether the resource rules 171 associated with the email resources 165 are satisfied by the email resources 165. For instance, the access control service 174 may determine that a client device 120 is authorized to access the email resources 165 if the attachments to the email resources 165 have been stripped from the email resources 165 in accordance with the resource rules 171, which specify that the email resources 165 may not have attachments. In other embodiments, the access control service 174 may determine whether the client device is authorized based at least in part on at least one of the device profile 123, user identifiers 132, or device identifiers 135.

The access control service 174 may be further executed to modify the email resources 165 to satisfy the resource rules 171 associated with the email resources 165. In certain embodiments, the access control service 174 may modify the email resources 165 in response to a determination that the email resources 165 do not satisfy the resource rules 171 associated with the email resources 165. In particular, the access control service 174 may modify the email resources 165 so that the email resources 165 satisfy the resource rules 171 associated with the email resources 165. In some embodiments, the access control service 174 may modify at least one portion of the email resources 165. In other embodiments, the access control service 174 may modify all portions of and/or the entirety of the email resources 165.

In any instance, the access control service 174 may modify the email resources 165 by formatting, encoding, configuring, adding, removing, stripping, moving, replacing or flagging portions of the email resources. In one embodiment, the access control service 174 may modify the email resources 165 by formatting the email resources 165 into HyperText Markup Language (HTML), Rich Text, Plain Text, and/or other formats. In another embodiment, the access control service 174 may modify the email resources 165 by encoding the email resources 165 using Advanced Encryption Standard (AES), Data Encryption Standard (DES), and/or other encryption protocols. In yet another embodiment, the access control service 174 may modify the email resources 165 by configuring the email resources 165 to be exclusively accessible via at least one secure container application, such as a client side application 126. In yet a further embodiment, the access control service 174 may modify the email resources 165 by adding portions to and/or or removing portions from the email resources 165, for instance, by adding or removing an email signature.

Additionally, in an exemplary embodiment, the access control service 174 may modify the email resources 165 by removing portions from the email resources 165 and configuring the removed portions of the email resources 165 to be exclusively accessible via a secure container application, such as the client side application 126. For example, the access control service 174 may remove attachments to the email resources 165 from the email resources 165, may encode the removed attachments based at least in part on at least one cryptographic key, and may make the removed attachments and cryptographic keys accessible to the client side application 126. In another embodiment, the access control service 174 may modify the email resources 165 by performing at least one of decrypting the email resources 165, re-encrypting the email resources 165, cryptographically signing email resources 165, or re-signing email resources 165. In yet another embodiment, the access control service 174 may modify the email resources 165 by moving certain portions the email resources 165, such as by moving a photograph from the body of the email resources 165 to the attachments of the email resources 165. In yet a further embodiment, the access control service 174 may modify the email resources 165 by replacing certain portions of the email resources 165, such as replacing misspelled text with the properly spelled text. In even yet a further embodiment, the access control service 174 may modify the email resources 165 by flagging the email resources 165 as having been modified, such as attaching an indication to the email resources 165 that provides information related to the modification of the email resources 165.

The access control service 174 may be yet further executed to transmit at least one email resource 165 to at least one client device 120. In certain embodiments, the access control service 174 may transmit the email resources 165 to the client devices 120 responsive to a determination that the client devices 120 are authorized to access the email resources 165. In some embodiments, the access control service 174 may transmit the email resources 165 to the client devices 120 responsive to modifying the email resources 165 to satisfy the resource rules 171 associated with the email resources 165. In one embodiment, the access control service 174 may directly transmit the email resources 165 to a client side application 126 executed by the client devices 120. In another embodiment, the distribution service 174 may make the email resources 165 available for download by the client devices 120 and may transmit the email resources 165 to the client devices 120 upon receiving requests 177 to download the email resources 165 from the client devices 120. In any instance, the access control service 174 may establish a communicative connection with the client devices 120 by utilizing a secure transmission protocol, such as HTTPS/SSL, before transmitting the email resources 165 to the client devices 120.

Figure 2:
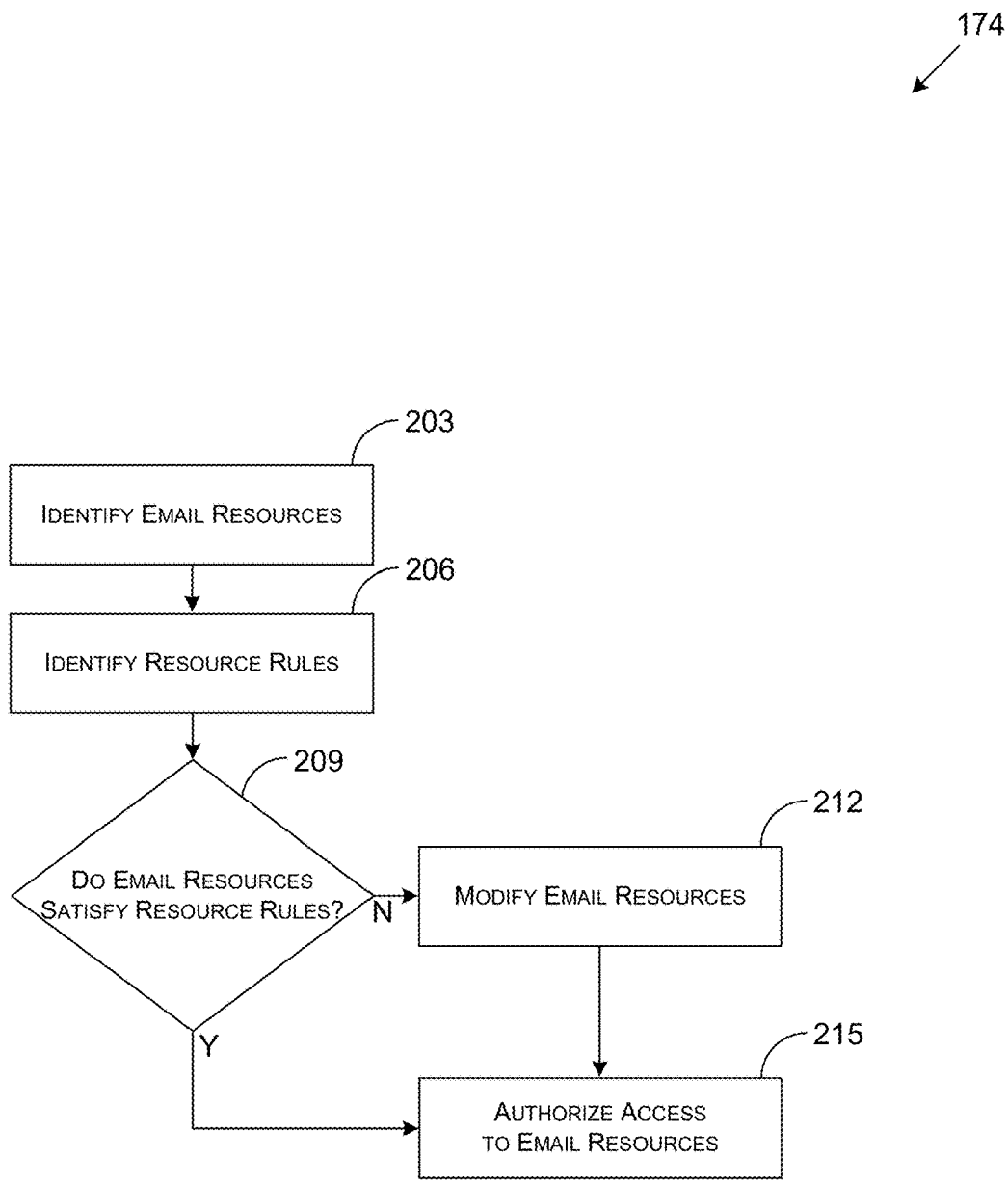
FIG. 2 illustrates a flow diagram of exemplary functionality performed by an access control service executed by an access control server in the networked environment of FIG. 1 according to certain embodiments of the present disclosure.

FIG. 2 is a flowchart illustrating exemplary functionality performed by an access control service 174 executed by an access control server (FIG. 1) according to certain embodiments. It is understood that the flowchart of FIG. 2 provides merely an example of the many different types of functional arrangements that may be employed to implement the operation of the access control service 174 as described herein. As an alternative, the flowchart of FIG. 2 may be viewed as depicting an example of steps of a method implemented in the access control server 150 according to at least one embodiment.

Beginning with step 203, the access control service 174 may identify at least one email resource 165. In certain embodiments, the access control service 174 may identify at least one email resource 165 associated with at least one client device 120. In one embodiment, the email resources 165 may be associated with the client devices 120 if the email resources 165 are addressed to the client devices 120 and/or the users of the client devices 120. For instance, the email resources 165 may be addressed to the client devices 120 and/or the users of the client devices 120 if the identities of the client devices 120 and/or the users of the client devices 120 are specified within the email headers, email sender fields, email CC fields, email BCC fields, email recipient fields, email subject fields, email bodies, email signatures, and/or email footers of the email resources 165. In another embodiment, the email resources 165 may be associated with the client devices 120 if the email resources 165 are accessible to the client devices 120, for instance, via at least one user identifier, at least one device identifier, and/or at least one device profile associated with the client devices 120. In yet another embodiment, the email resources 165 may be associated with the client devices 120 according to a listing of associated email resources 165 and client devices 120. In any instance, the email resources 165 may include email messages, email attachments, and/or other electronic data, as described herein.

Next, in step 206, the access control service 174 may identify at least one resource rule 171. In certain embodiments, the access control service 174 may identify at least one resource rule 171 associated with at least one email resource 165. In some embodiments, a given resource rule 171 may be associated with at least one email resource 165 and, similarly, a given email resource 165 may be associated with at least one resource rule 171. In one embodiment, the resource rules 171 may be associated with the email resources 165 if the resource rules 171 are embedded within the email headers, email bodies, email signatures, and/or email footers of the email resources 165. In particular, the email resources 165 may include embedded metadata and/or other instructions that represent at least one resource rule 171. In another embodiment, the resource rules 171 may be associated with the email resources 165 if the resource rules 171 are affixed to the email resources 165, such as attachments to the email resources 165. In yet another embodiment, the resource rules 171 may be associated with the email resources 165 according to a listing of associated email resources 165 and resource rules 171. In any instance, the resource rules 171 may regulate access to the email resources 165 associated with the resource rules 171 by the client devices 120 associated with the email resources 165, as described herein.

Then, in step 209, the access control service 174 may determine whether the email resources 165 satisfy the resource rules 171 associated with the email resources 165. In certain embodiments, the access control service 174 may determine that the client devices 120 associated with the email resources 165 are authorized to access the email resources 165 if the email resources 165 satisfy the associated resources rules 171. In any instance, the access control service 174 may determine whether the state of the email resources 165 satisfies the requirements specified by the associated resource rules 171. In particular, the access control service 174 may determine whether the email headers, email sender fields, email CC fields, email BCC fields, email recipient fields, email subject fields, email bodies, email signatures, email footers, and/or email attachments of the email resources 165 satisfy the associated resource rules 171, as described herein.

If the access control service 174 determines that the email resources 165 do not satisfy the resource rules 171, then the access control service 174 may proceed to step 212 and may modify the email resources 165. In certain embodiments, the access control service 174 may modify the email resources 165 so that the email resources 165 satisfy the resource rules 171 associated with the email resources 165. In some embodiments, the access control service 174 may modify at least one portion of the email resources 165. In other embodiments, the access control service 174 may modify all portions of and/or the entirety of the email resources 165. In any instance, the access control service 174 may modify the email resources 165 by formatting, encoding, configuring, adding, removing, stripping, moving, replacing and/or flagging portions of the email resources 165, as described herein.

On the contrary, if the access control service 174 determines that the email resources 165 satisfy the resource rules 171, then the access control service 174 may proceed to step 215 and may authorize the client devices 120 to access the email resources 165. In certain embodiments, the access control service 174 may authorize the client devices 120 to access the email resources 165 by transmitting the email resources 165 to at least one client side application 126 executed by the client devices 120. In some embodiments, the access control service 174 may authorize the client devices 120 to access the email resources 165 by notifying the client devices 120 that the email resources 165 may be downloaded from the access control service 174 and may further transmit the email resources 165 to the client devices 120 upon a request 177. In any instance, the access control service 174 may authorize the client devices 120 to access the email resources 165 by providing the client devices 120 with a means of accessing the email resources 165. In one embodiment, the access control service 174 may authorize the client devices 120 to access at least one unmodified email resource 165. In another embodiment, the access control service 174 may authorize the client devices 120 to access at least one email resource 165 that has been modified by the access control service 174 so that the email resources 165 satisfy the resource rules 171 associated with the email resources 165.

Figure 3:
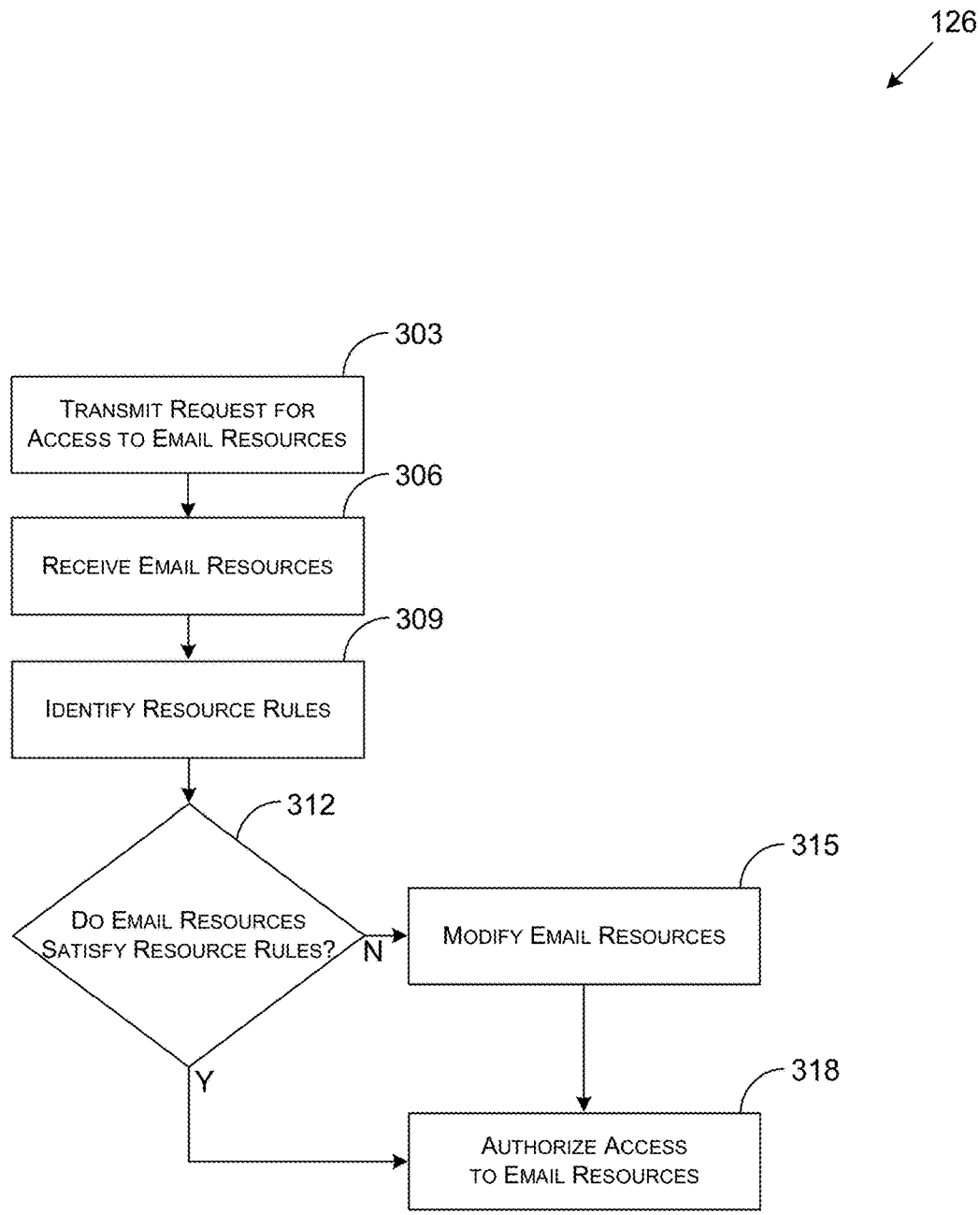
FIG. 3 illustrates a flow diagram of exemplary functionality performed by a client side application executed by a client device in the networked environment of FIG. 1 according to certain embodiments of the present disclosure.

FIG. 3 is a flowchart illustrating exemplary functionality performed by a client side application 126 executed by a client device 120 (FIG. 1) according to certain embodiments. It is understood that the flowchart of FIG. 3 provides merely an example of the many different types of functional arrangements that may be employed to implement the operation of the client side application 126 as described herein. As an alternative, the flowchart of FIG. 3 may be viewed as depicting an example of steps of a method implemented in the client device 120 according to at least one embodiment.

Beginning with step 303, the client side application 126 may transmit at least one request 177 to access at least one email resource 165. In certain embodiments, the client side application 126 may transmit requests 177 to an access control service 174. In some embodiments, the requests 177 may include a listing of specific email resources 165 that the client device 120 seeks to access. In other embodiments, the requests 177 may include an indication that the client device 120 seeks access to email resources 165 associated with the client device 120, such as email resources 165 addressed to the user of the client device 120. In any instance, the requests 177 may include data from the data store 122 of the client device 120, such as device profiles 123, user identifiers 132, and device identifiers 135 associated with the client device 120, as described herein.

Next, in step 306, the client side application 126 may receive at least one email resource 165. In certain embodiments, the client side application 126 may receive at least one email resource 165 from an access control service 174 executed by an access control server 150. In one embodiment, the client side application 126 may directly receive the email resources 165 from the access control service 174. In another embodiment, the client side application 126 may receive at least one indication from the access control service 174 that specify that the email resources 165 are available for download from the access control service 174. In such embodiment, the client side application 126 may request to download the email resources 165 from the access control service 174 in response to receiving an indication that the email resources 165 are available for download from the access control service 174. In some embodiments, the client side application 126 may receive at least one email resource 165 from an enterprise email service, such as Microsoft Exchange or Lotus Notes, or from a distribution service executed by a distribution server, as described herein.

Then, in step 309, the client side application 126 may identify at least one resource rule 171. In certain embodiments, the client side application 126 may identify at least one resource rule 171 associated with at least one email resource 165. In some embodiments, the resource rules 171 may be associated with multiple email resources 165 and the email resources 165 may be associated with multiple resource rules 171, as described herein. In one embodiment, the resource rules 171 may be associated with the email resources 165 if the resource rules 171 are embedded within the email headers, email bodies, email signatures, and/or email footers of the email resources 165. In particular, the email resources 165 may include embedded metadata and/or other instructions that represent at least one resource rule 171. In another embodiment, the resource rules 171 may be associated with the email resources 165 if the resource rules 171 are affixed to the email resources 165, such as attachments to the email resources 165. In yet another embodiment, the resource rules 171 may be associated with the email resources 165 according to a listing of associated email resources 165 and resource rules 171. In any instance, the resource rules 171 may regulate access to the email resources 165 associated with the resource rules 171 by the client devices 120 associated with the email resources 165, as described herein.

Next, in step 312, the client side application 126 may determine whether the email resources 165 satisfy the resource rules 171 associated with the email resources 165. In certain embodiments, the client side application 126 may determine that the client device 120 associated with the email resources 165 is authorized to access the email resources 165 if the email resources 165 satisfy the associated resources rules 171. In any instance, the client side application 126 may determine whether the state of the email resources 165 satisfies the requirements specified by the associated resource rules 171. In particular, the client side application 126 may determine whether the email headers, email sender fields, email CC fields, email BCC fields, email recipient fields, email subject fields, email bodies, email signatures, email footers, and/or email attachments of the email resources 165 satisfy the associated resource rules 171, as described herein.

If the client side application 126 determines that the email resources 165 do not satisfy the resource rules 171, then the client side application 126 may proceed to step 315 and may modify the email resources 165. In certain embodiments, the client side application 126 may modify the email resources 165 so that the email resources 165 satisfy the resource rules 171 associated with the email resources 165. In some embodiments, the client side application 126 may modify at least one portion of the email resources 165. In other embodiments, the access control service 174 may modify all portions of and/or the entirety of the email resources 165. In any instance, the client side application 126 may modify the email resources 165 by formatting, encoding, configuring, adding, removing, stripping, moving, replacing and/or flagging portions of the email resources 165, as described herein.

On the contrary, if the client side application 126 determines that the email resources 165 satisfy the resource rules 171, then the client side application 126 may proceed to step 318 and may authorize the client device 120 to access the email resources 165. In certain embodiments, the client side application 126 may authorize the client device 120 to access the email resources 165 by providing the client devices 120 with a means of accessing the email resources 165. For example, the client side application 126 may enable storing, installing, activating, rendering and/or executing the email resources 165 on the client device 120, as described herein. In one embodiment, the client side application 126 may authorize the client device 120 to access at least one unmodified email resource 165. In another embodiment, the client side application 126 may authorize the client device 120 to access at least one email resource 165 that has been modified by the access control service 174 so that the email resources 165 satisfy the resource rules 171 associated with the email resources 165. In yet another embodiment, the client side application 126 may authorize the client device 120 to access at least one email resource 165 that has been modified by the client side application 126 so that the email resources 165 satisfy the resource rules 171 associated with the email resources 165.

Figure 4:
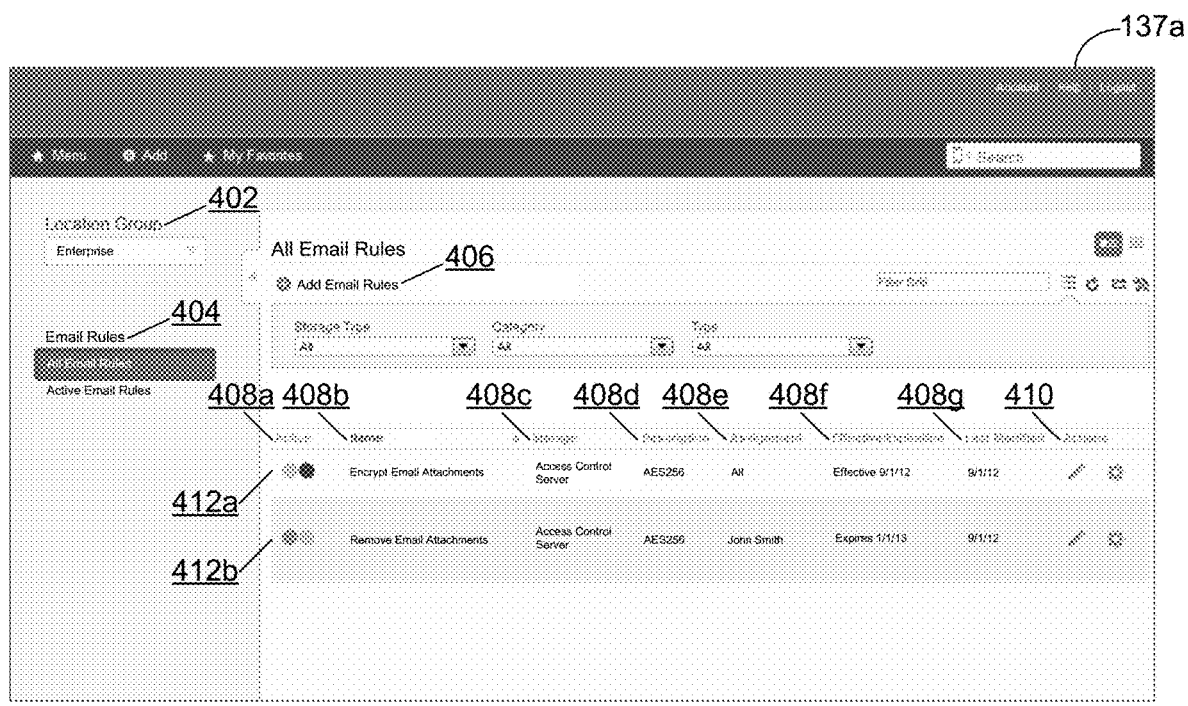
FIGS. 4-5 are exemplary user interfaces rendered by an access control service executed by an access control server in the networked environment of FIG. 1 according to certain embodiments of the present disclosure.

FIG. 4 is an example of a user interface 137a that allows an administrator of an access control service 174 (FIG. 1) to associate at least one resource rule 171 (FIG. 1) with at least one email resource 165 (FIG. 1). In certain embodiments, the user interface 137a may include a grouping view field 402, a rules view field 404, an add rules button 406, at least one rules description field 408, at least one action button 410, and at least one defined rule 412.

The grouping view field 402 may allow the administrator to select a group of client devices 120 and/or a group of users of client devices 120 to manage. For example, the administrator may manipulate the resource rules 171 that apply to the "Enterprise" group of client devices 120 by selecting the "Enterprise" grouping from the pull-down provided by the grouping view field 402. The rules view field 404 may allow the administrator to filter the resource rules 171 to manage. For instance, the administrator may filter the resource rules 171 by either selecting the "All Email Rules" set of resource rules 171 or the "Active Email Rules" set of resource rules 171 from the options provided by the rules view field 404.

The add rules button 406 may allow the administrator to add new resource rules 171 to the collection of resource rules 171 that apply to the "Enterprise" group of client devices 120. For example, invoking the add rules button 406 may instruct the access control service 174 to provide another user interface 137 in which the administrator may define at least one new resource rule 171, as will be described in FIG. 5. The rules description fields 408 may specify at least one characteristic that describes each of the resource rules 171. For instance, the rules description fields 408 may include indications of whether a rule is active 408a, a name of a rule 408b, a storage location of a rule 408c, a brief description of a rule 408d, an assignment of a rule 408e, an effective date and/or expiration date of a rule 408f, and a last modified date of a rule 408g. The action buttons 410 may allow an administrator to take at least one action to a resource rule 171, such as editing the resource rule 171 and/or adjusting the settings of a resource rule 171. The defined rules 412 may include at least one resource rule 171 that has been previously created by an administrator of the access control service 174, such as the "Encrypt Email Attachments" rule 412a and the "Remove Email Attachments" rule 412b.

Figure 5:
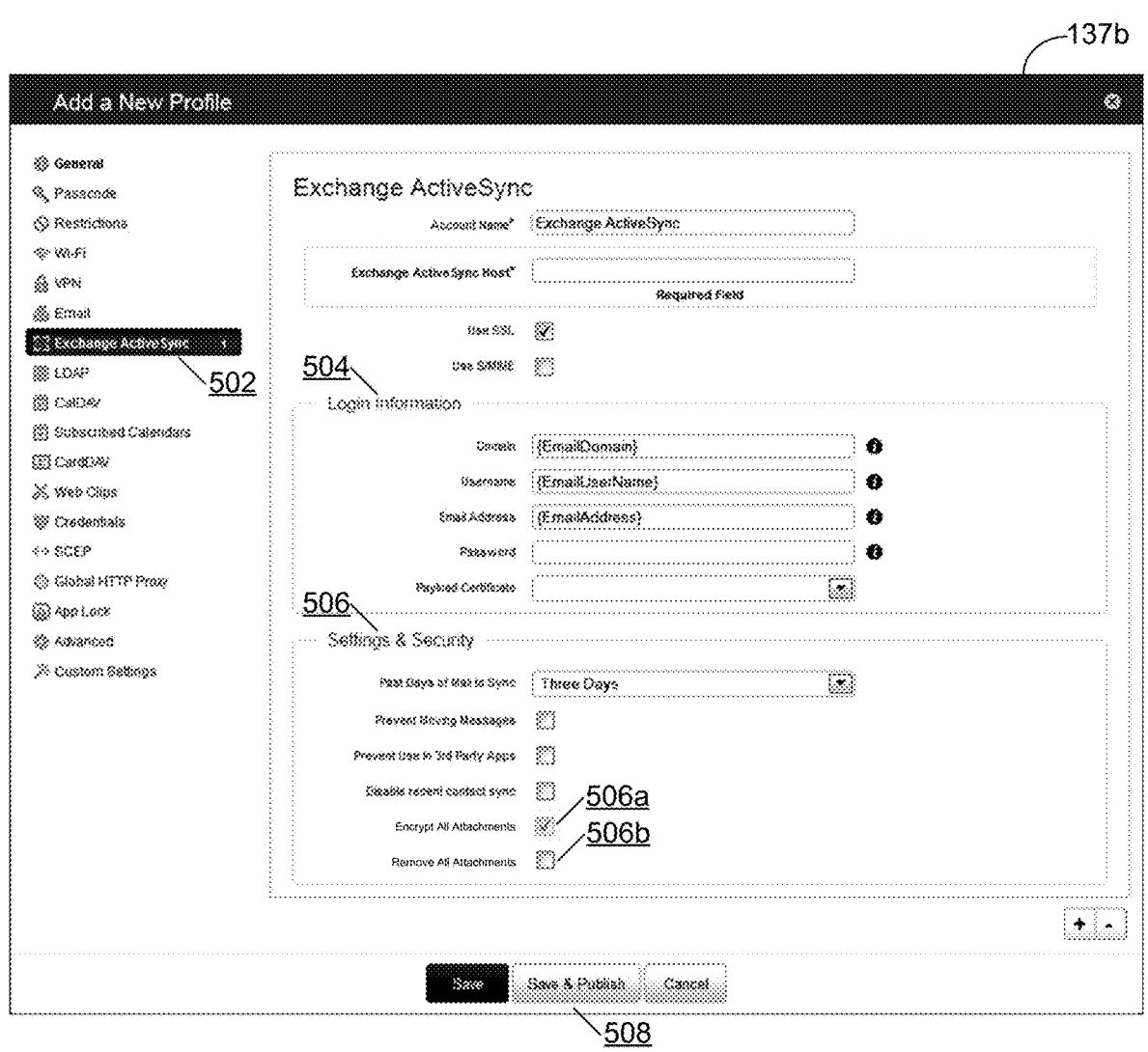

FIG. 5 is an example of a user interface 137b that allows an administrator of an access control service 174 (FIG. 1) to create at least one new resource rule 171 (FIG. 1), which may provide and/or control access to at least one application and/or service accessible to at least one client device 120 (FIG. 1). In certain embodiments, the user interface 137b may include a rule type field 502, an access credentials field 504, an access rights field 506, and at least one action button 508. In some embodiments, the access rights field 506 may include an "Encrypt All Attachments" button 506a and a "Remove All Attachments" button 506b.

The rule type field 502 may include one of more types of resource rules 171 that may be created through the user interface 137b. For example, an administrator of the access control service 174 may select "Exchange ActiveSync" from the rules type field 502 to create resource rules 171 associated with email resources 165 (FIG. 1). The access credentials field 504 may include at least one field that accepts input of at least one credential for access to at least one application and/or service accessible to the client devices 120. For instance, an administrator of the access control service 174 may input the "Domain," "Username," "Email Address," "Password," and "Payload Certificates" associated with the client devices 120. The access rights field 506 may include at least one access right that may be defined for the client devices 120, which may control access by client devices 120 to applications and/or services. For example, an administrator of the access control service 174 may apply at least one access restriction including "Prevent Moving Messages," "Prevent Use in 3$^{rd}$ Party Apps," "Disable recent contact sync," "Encrypt All Attachments" 506a, and "Remove All Attachments" 506b. The action buttons 508 may include at least one button that saves and/or deletes the resource rules 171 defined in the user interface 137b. For example, an administrator of the access control service 174 may invoke the "Save" action button 508 to store the resource rules 171 associated with the email resources 165 in the data store 153 (FIG. 1) of the access control server 150 (FIG. 1).

Figure 6:
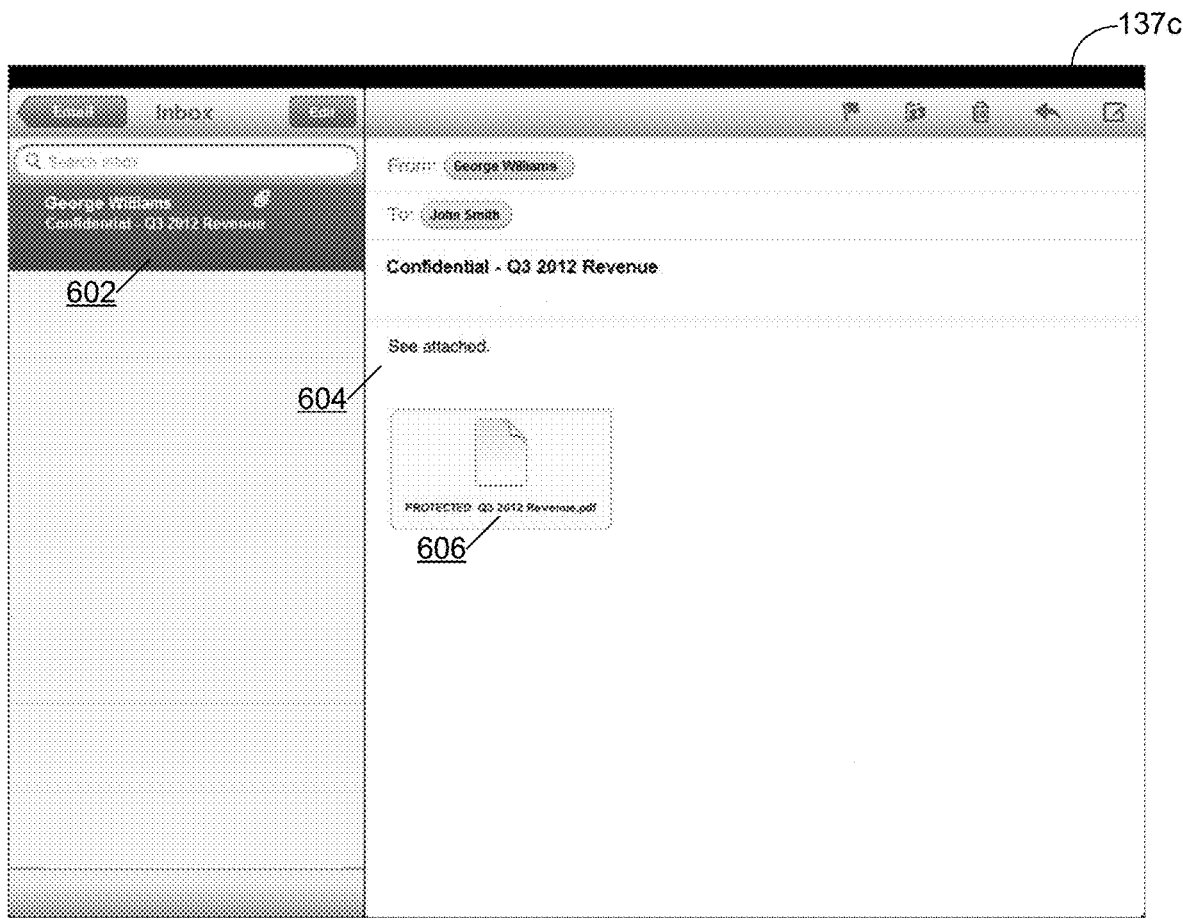
FIGS. 6-11 are exemplary user interfaces rendered by a client side application executed by a client device in the networked environment of FIG. 1 according to certain embodiments of the present disclosure.

FIG. 6 is an example of a user interface 137c executed by a client side application 126 (FIG. 1) on a client device 120 (FIG. 1). In certain embodiments, the client side application 126 may be an application native to the client device 120 that is capable of receiving and/or rendering email resources 165. For example, the client side application 126 may be a native email application, such as Microsoft Outlook or Apple Mail. The client side application 126 may include an email selection field 602 and an email viewing pane 604. The email selection field 602 may include at least one email message that may be selected to access within the email viewing pane 604. For example, the user of the client device, such as "John Smith," may select an email message entitled "Confidential—Q3 2012 Revenue" sent to "John Smith" from "George Williams." The email viewing pane 604 may include a sender field, a recipient field, a title field, a body field, and at least one attachment 606. For instance, the email viewing pane 604 may provide a user of a client device 120 to access the attachment entitled "PROTECTED: Q3 2012 Revenue.pdf"

Figure 7:
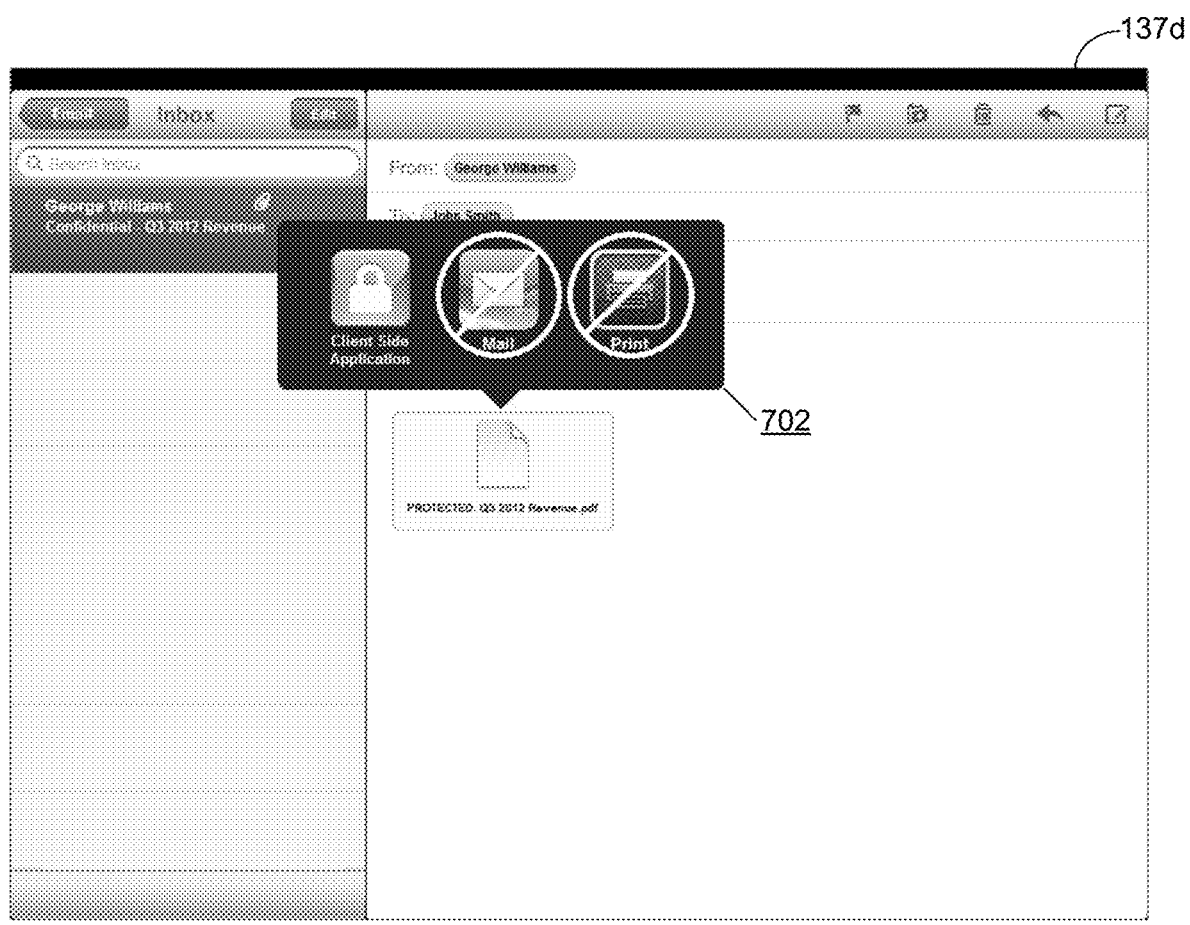

FIG. 7 is an example of a user interface 137d executed by a client side application 126 (FIG. 1) on a client device 120 (FIG. 1). In certain embodiments, the client side application 126 may be an application native to the client device 120 that is capable of receiving and/or rendering email resources 165. For example, the client side application 126 may be a native email application, such as Microsoft Outlook or Apple Mail, as similarly described in FIG. 6. In some embodiments, the user of the client device 120 may request to access the attachment entitled "PROTECTED: Q3 2012 Revenue.pdf" by selecting the attachment on the user interface 137d. In one embodiment, the attachment entitled "PROTECTED: Q3 2012 Revenue.pdf" may be associated with resource rules 171 (FIG. 1) that specify that the email resources 165 may only be accessed via a secure container application.

The user interface 137d may provide an access selection field 702 to provide the user of the client device 120 with at least one access application and/or service that is available for accessing the email resources 165 in accordance with the associated resource rules 171. For example, the access selection field 702 may specify that a client side application 126 with secure container capabilities may be selected, a client side application 126 with native email capabilities may not be selected, and a printing function of the client device 120 may not be selected. By selecting the client side application 126 with secure container capabilities from the access selection field 702, the current client side application 126 with native email capabilities may call on the client side application 126 with secure container capabilities in order to access the email attachment.

Figure 8:
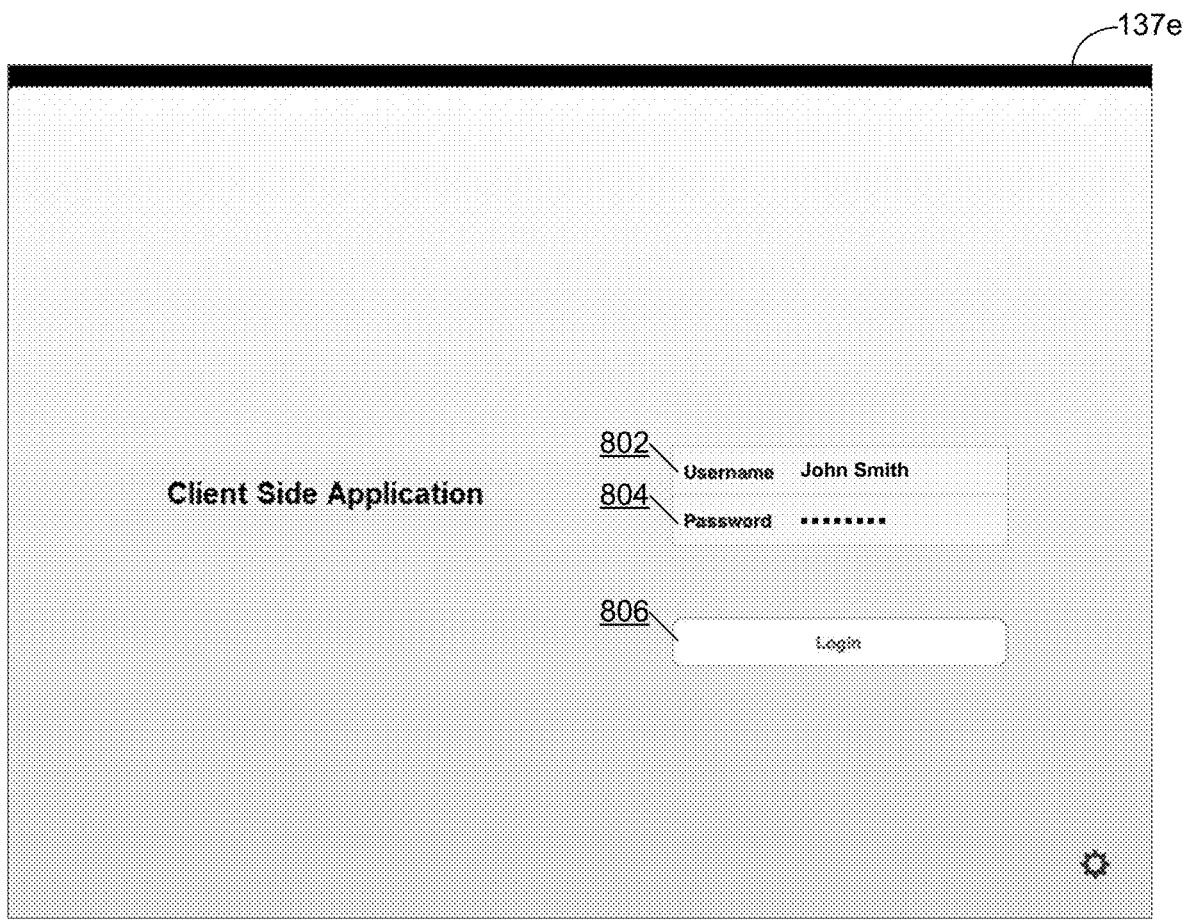

FIG. 8 is an example of a user interface 137e executed by a client side application 126 (FIG. 1) on a client device 120 (FIG. 1). In certain embodiments, the client side application 126 may be a secure container application that is capable of receiving and/or rendering email resources 165, as described herein. In some embodiments, the user interface 137e may provide an authentication form which must be filled out by the user of the client device 120 in order to gain access to at least one email resource 165 accessible through the secure container environment of the client side application 126. In particular, the user interface 137e may provide an authentication form that includes a username field 802, a password field 804, and a login button 806. A user of the client device 120, such as "John Smith," may provide a username, such as "John Smith," in the username field 802, may provide a password, such as "········," and may invoke the login button 806 to provide the access credentials to the client side application 126. Responsive to a determination that the access credentials provided by the user of the client device 120 are authorized, the client side application 126 may provide the user of the client device 120 with access to the secure container environment of the client side application 126.

Figure 9:
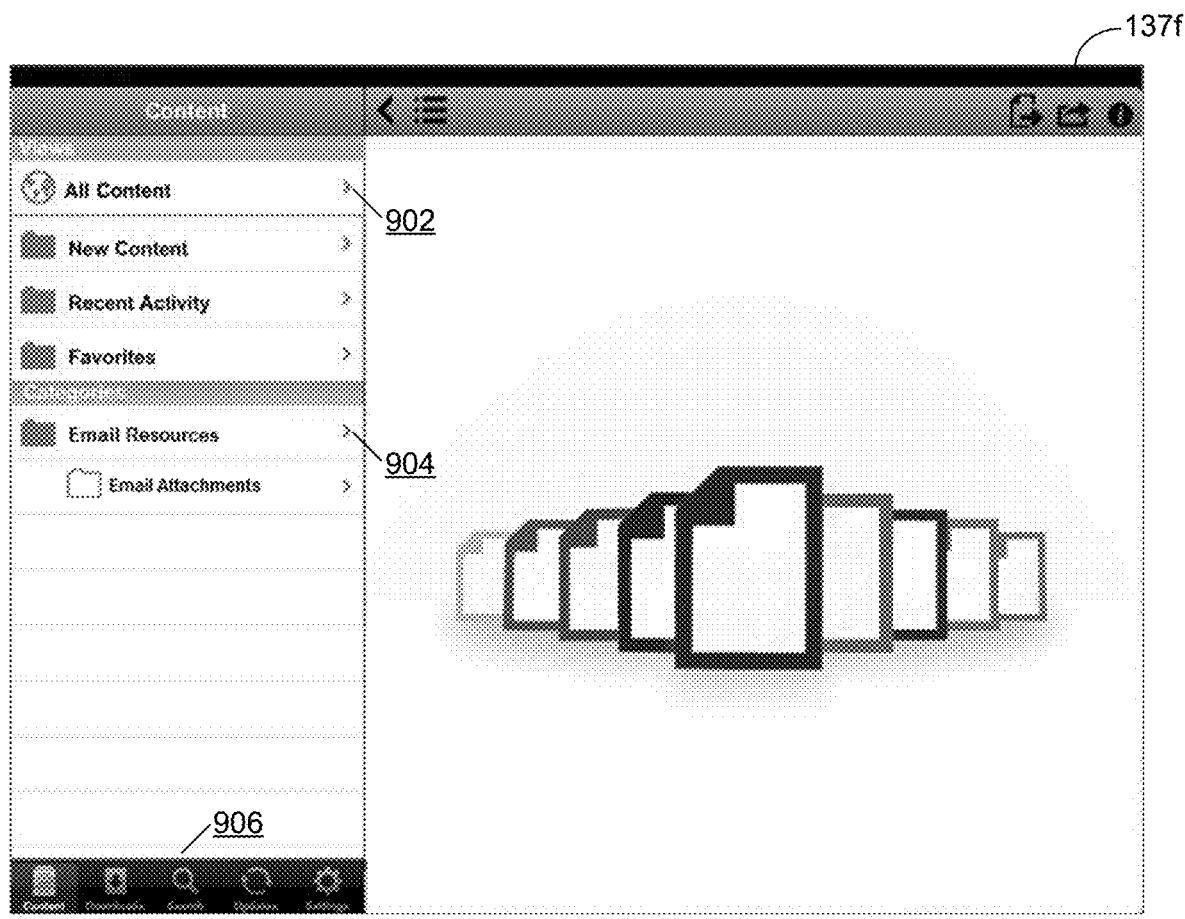

FIG. 9 is an example of a user interface 137f executed by a client side application 126 (FIG. 1) on a client device 120 (FIG. 1). In certain embodiments, the client side application 126 may be a secure container application that is capable of receiving and/or rendering email resources 165, as described herein. The secure container environment of the client side application 126 may include a views pane 902, a categories pane 904, and action buttons 906. The views pane 902 may include at least one view that is accessible to the user of the client device 120, such as an "all content" view, a "new content" view, a "recent activity" view, and a "favorites" view. The user of the client device 120 may select one of the available views, each of which may include a subset of email resources 165 related to the certain view. The categories pane 904 may include at least one category of email resources 165 that is available to the user of the client device 120, such as an "Email Attachments" category that is a subset of an "Email Resources" category. The user of the client device 120 may, for instance, select the "Email Attachments" category to access at least one email attachment that is configured to be accessible via the secure container environment of the client side application 126. The action buttons 906 may include a "Content" button, a "Downloads" button, a "Search" button, an "Updates" button, and a "Settings" button that may launch other user interfaces 137 provided by the client side application 126 to enable additional views, applications, and/or services.

Figure 10:
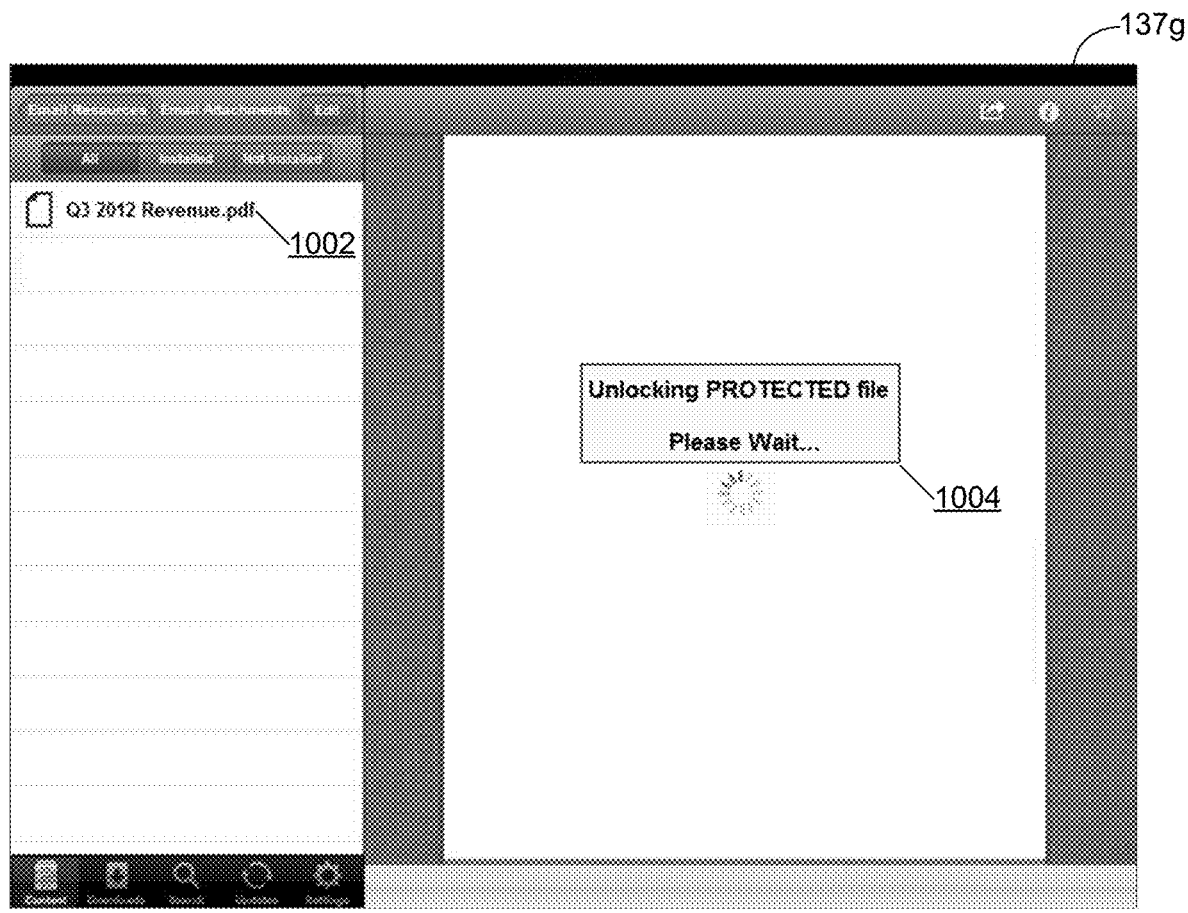

FIG. 10 is an example of a user interface 137e executed by a client side application 126 (FIG. 1) on a client device 120 (FIG. 1). In certain embodiments, the client side application 126 may be a secure container application that is capable of receiving and/or rendering email resources 165, as described herein. The secure container environment of the client side application 126 may include an accessible resource listing 1002 and an access notification 1004. The user of the client device 120 may select an email resource 165, such an as email attachment, from the accessible resource listing 1002. Responsive to the user of the client device 120 selecting the "Q3 2012 Revenue.pdf" email resource 165 from the accessible resource listing 1002, the client side application 126 may provide the user with access to the email resource 165 by unlocking the protected file. In particular, the email resource 165 may have been encrypted with a symmetric cryptographic key and/or an asymmetric cryptographic key by an access control service 174 (FIG. 1) according to at least one resource rule 171 (FIG. 1) associated with the email resource 165, as described herein. Consequently, the client side application 126 may decrypt the email resource 165 to enable access to the email resource 165 and may provide an access notification 1004 that specifies that the client side application 126 is "Unlocking (the) PROTECTED file" and to "Please Wait" to access the email resource 165 while the client side application 126 unlocks the email resource 165.

Figure 11:
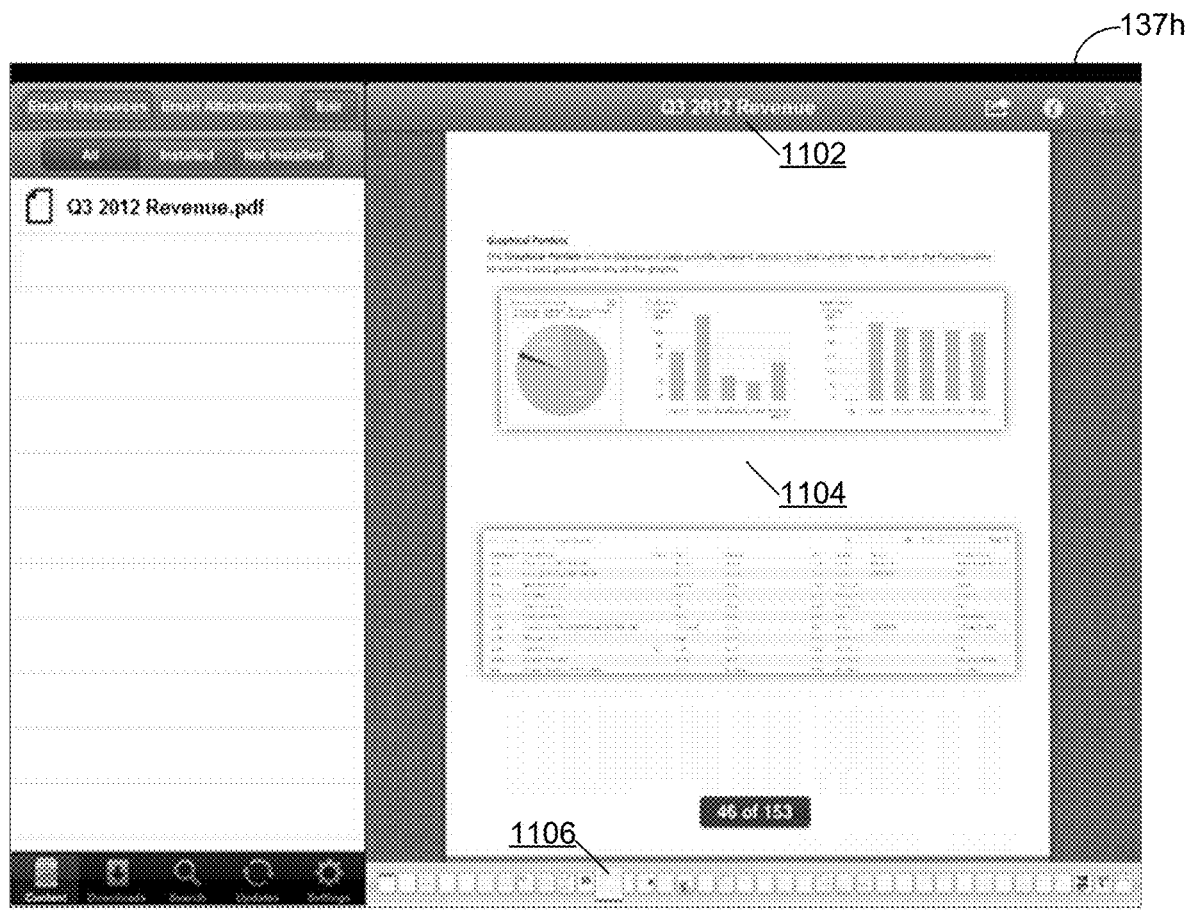

FIG. 11 is an example of a user interface 137e executed by a client side application 126 (FIG. 1) on a client device 120 (FIG. 1). In certain embodiments, the client side application 126 may be a secure container application that is capable of receiving and/or rendering email resources 165, as described herein. The client side application 126 may include a resource title pane 1102, a resource content pane 1104 and a resource page selection pane 1106. The resource title pane 1102 may specify the title of the email resources 165, such as "Q3 2012 Revenue." The resource content pane 1104 may include the body of the email resources 165, such as the pages of the PDF file "Q3 2012 Revenue." The resource page selection pane 1106 may include at least one page of the email resources 165. The user of the client device 120 may, for example, select a page from the resource page selection pane 1106. Responsive to the user of the client device 120 selecting a certain page from the resource page selection pane 1106, the client side application 126 may navigate to the selected page and present the content of the selected page in the resource content pane 1104.

Figure 12:
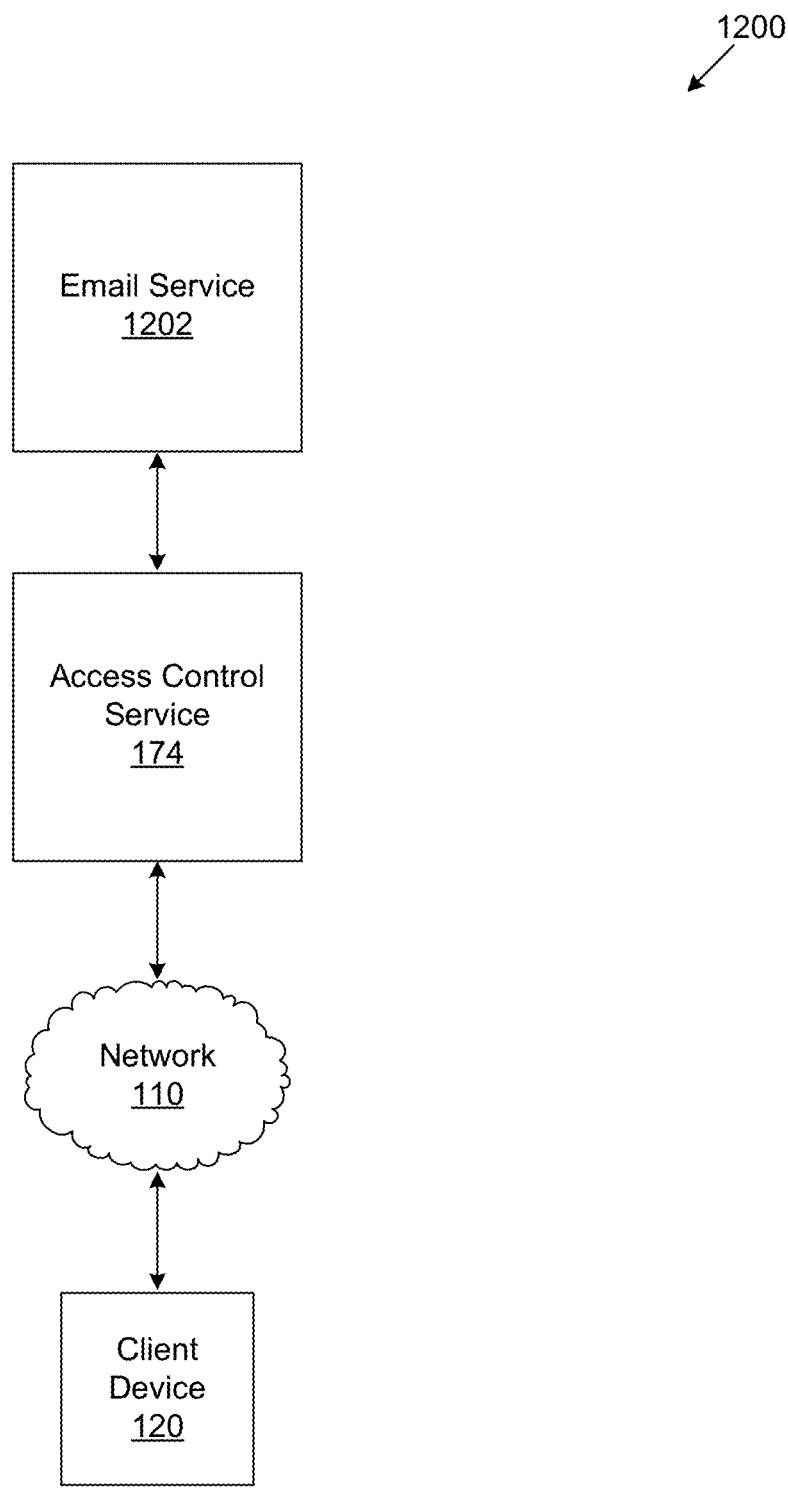
FIG. 12 illustrates a block diagram of a networked environment according to certain embodiments of the disclosure.

FIG. 12 depicts certain illustrative components for a networked environment 1200 according to various embodiments. In certain embodiments, the networked environment 1200 may include at least one network 110, at least one client device 120, an access control service 174, and at least one email service 1202. The email services 1202 may be configured to provide the client devices 120 with access to at least one email resource 165 (FIG. 1) associated with the email services 1202. As an example, the email services 1202 may be and/or include at least one enterprise email service, such as Microsoft Exchange, Lotus Notes, and/or other services capable of distributing email resources 165 to client devices 120. The access control service 174 may be configured to authorize the client devices 120 to access the email services 1202, may control the manner in which the client devices 120 are authorized to access the email services 1202, and may provide the client devices 120 with access to the email services 1202.

In one embodiment, the access control service 174 may be configured to proxy email resources 165 provided to the client devices 120 by the email services 1202. The access control service 174 may, for instance, filter all email resources 165 transmitted between the email services 1202 and the client devices 120. Alternatively, the access control service 174 may proxy email resources 165 in transit to the client devices 120 from the email services 1202. In another embodiment, the access control service 174 may be configured to provide a gateway for access to the email services 1202. The access control service 174 may, for instance, provide authorized client devices 120 with access to the email services 1202 and deny unauthorized client devices 120 from accessing the email services 1202.

In any instance, the access control service 174 may be configured to determine whether the client devices 120 are authorized to access the email resources 165. The access control service 174 may, for example, receive at least one request 177 (FIG. 1) to access the email services 1202 from the client devices 120. The access control service 174 may determine whether the client devices 120 associated with the requests 177 are authorized to access the email services 1202 based on, for instance, at least one device profile 123 (FIG. 1), at least one user identifier 132 (FIG. 1), at least one device identifier 135 (FIG. 1) associated with the client device 120, which may be included in the requests 177. The access control service 174 may provide the client devices 120 with access to the email services 1202 in response to a determination that the client devices 120 are authorized to access the email services 1202. In one embodiment, the access control service 174 may establish a communicative connection between the email services 1202 and the client devices 120, which may facilitate the transmission of email resources 165 between the email services 1202 and the client devices 120. In another embodiment, the access control service 174 may establish a communicative connection between the access control service 174 and the client devices 120, which may facilitate the transmission of email resources 165 associated with the email service 1202 between the access control service 174 and the client devices 120.

Additionally, the access control service 174 may be configured to control access to the email resources 165 by the client devices 120. The access control service 174 may determine which email resources 165 the client devices 120 are authorized to access. The access control service 174 may also modify the email resources 165 before providing the client devices 120 with access to the email resources 165.

In certain embodiments, the access control service 174 may determine whether the email resources 165 are accessible via at least one unauthorized application on the client devices 120 and may modify the email resources 165 to be inaccessible via the unauthorized applications. In some embodiments, the access control service 174 may query a listing of unauthorized applications, may determine whether the email resources 165 are configured to be accessible via the listed unauthorized applications, and, if so, may modify the email resources 165 to be inaccessible via the listed unauthorized applications. In one embodiment, the access control service 174 may encrypt the email resources 165 based on at least one encryption key to prevent unauthorized applications on the client devices 120 from accessing the email resources 165. In particular, the email resources 165, once encrypted, may not be accessed by applications that do not have the requisite decryption key. Thus, the access control service 174 may encrypt the email resources 165 based on at least one cryptographic schema that is foreign to the unauthorized applications, preventing the unauthorized applications from decrypting the email resources 165, and thereby preventing the unauthorized applications from accessing the email resources 165. In another embodiment, the access control service 174 may modify the file format of the email resources 165 to prevent unauthorized applications on the client devices 120 from accessing the email resources 165. For example, the access control service 174 may determine which file formats are accessible by the unauthorized applications and change the file formats of the email resources 165 to file formats that are inaccessible by the unauthorized applications.

Moreover, in certain embodiments, the access control service 174 may modify the email resources 165 to be accessible via certain authorized applications. In some embodiments, the access control service 174 may query a listing of authorized applications, may determine whether the email resources 165 are configured to be accessible via the listed authorized applications, and, if not, may modify the email resources 165 to be accessible via the listed authorized applications. In one embodiment, the access control service 174 may encrypt the email resources 165 based on at least one cryptographic key that is associated with the authorized applications. Additionally, the access control service 174 may transmit the cryptographic key for decryption to the authorized applications on the client devices 120 so that the authorized applications may decrypt and access the email resources 165. In another embodiment, the access control service 174 may modify the file format of the email resources 165 to permit authorized applications on the client devices 120 to access the email resources 165 while preventing unauthorized applications on the client devices 120 from accessing the email resources 165. For example, the access control service 174 may determine which file extensions are accessible by the authorized applications and which file extensions are inaccessible by the unauthorized applications to change the file extensions of the email resources 165 to the identified file extensions to restrict the applications on the client devices 120 that may access the email resources 165.

Furthermore, the access control service 174 may be configured to provide the client devices 120 with access to the email services 1202 and/or the email resources 165 associated with the email services 1202. In one embodiment, the access control service 174 may be configured to transmit email resources 165 to the client devices 120. For example, the access control service 174 may establish a secure communicative connection with the client devices 120, such as HTTPS/SSL, through which the access control service 174 may transmit the email resources 165 associated with the email services 1202 to the client devices 120. In another embodiment, the access control service 174 may be further configured to transmit at least one cryptographic key to at least one client side application 126 on the client devices 120 to enable such client side applications 126 to access the email resources 165 by decrypting the email resources 165 with the transmitted cryptographic key.

As an example of the aforementioned embodiments, the access control service 174 may proxy at least one email resource 165 from an email service to a client device 120. Upon receiving the email resource 165, the access control service 174 may determine whether an administrator of the access control service 174 has specified certain applications that are authorized to access the email resources 165 and certain applications that are not authorized to access the email resources 165. For instance, the administrator may specify that applications created in-house may access the email resources 165 and that applications created by out-of-house may not access the email resources 165. Based on the administrator's specifications, the access control service 174 may modify the email resources 165 to be accessible via the in-house applications and inaccessible via the out-of-house applications. In particular, the access control service 174 may modify the email resources 165 based on an encryption key and/or file format that is foreign to the out-of-house applications. Once the email resources 165 are modified, the access control service 174 may transmit the email resources 165 to the proper client device 120. The access control service 174 may also transmit instructions to the in-house applications on the client device 120, including an appropriate decryption key, to provide the in-house applications with access to the email resources 165. Consequently, the in-house applications on the client device 120 may access the email resources 165 by decrypting the email resources 165 with the key received from the access control service 174, while the out-of-house applications on the client device 120 cannot access the email resources 165 due to their inability to decrypt the email resources 165.

Figure 13:
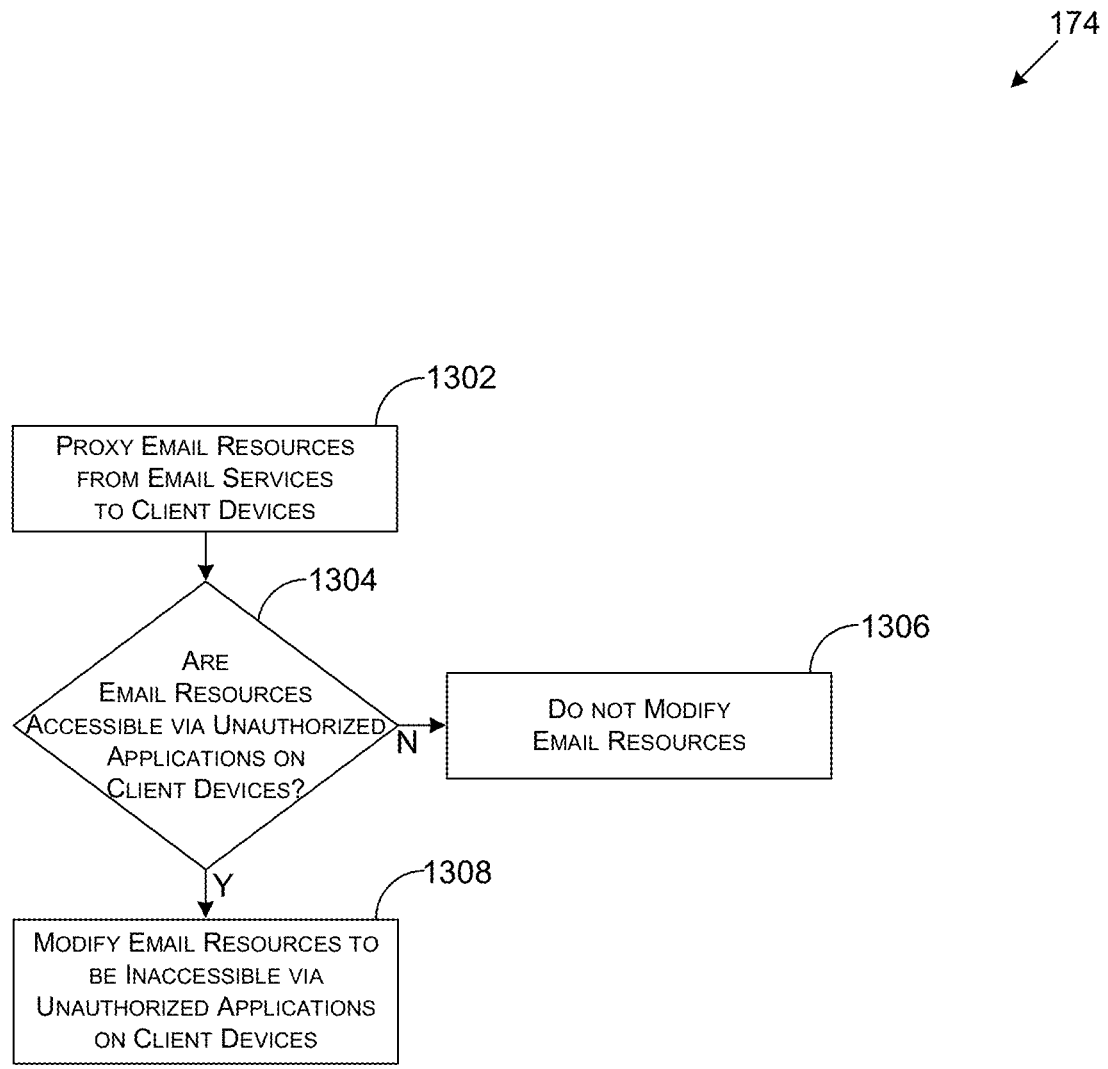
FIG. 13 illustrates a flow diagram of exemplary functionality performed by an access control service executed by an access control server in the networked environment of FIG. 12 according to certain embodiments of the present disclosure.

FIG. 13 is a flowchart illustrating exemplary functionality performed by an access control service 174 executed by an access control server 150 (FIG. 1) according to certain embodiments. It is understood that the flowchart of FIG. 13 provides merely an example of the many different types of functional arrangements that may be employed to implement the operation of the access control service 174 as described herein. As an alternative, the flowchart of FIG. 13 may be viewed as depicting an example of steps of a method implemented in the access control server 150 according to at least one embodiment.

Beginning with step 1302, the access control service 174 may proxy at least one email resource 165 (FIG. 1) from at least one email service 1202 (FIG. 12) to at least one client device 120 (FIG. 1). In one embodiment, the access control service 174 may be configured to proxy all data transmitted between the email services 1202 and the client devices 120. For example, the access control service 174 may stand in front of the email services 1202, as shown in FIG. 12, to intercept any email resources 165 being transmitted from the email services 1202 to client devices 120. The access control service 174 may further prohibit the email resources 165 from proceeding to the client devices 120 as transmitted by the email services 1202 according to at least one resource rule 171 (FIG. 1), as described herein. In another embodiment, the access control service 174 may be configured to act as a gateway that controls access to the email services 1202. For instance, the access control service 174 may transmit instructions to the email services 1202 that specify that email resources 165 intended for the client devices 120 must be transmitted to the client devices 120 via the access control service 174.

Next, in step 1304, the access control service 174 may determine whether the email resources 165 are accessible to the client devices 120 via at least one unauthorized application on the client devices 120. In certain embodiments, at least one resource rule 171 (FIG. 1) may specify that the client devices 120 are not authorized to access the email resources 165 via certain unauthorized applications on the client devices 120. In some embodiments, the resource rules 171 may specify a listing of applications that are not authorized to access the email resources 165 on the client devices 120. In one embodiment, the access control service 174 may query the data store 153 (FIG. 1) of the access control server 150 to determine whether any such resource rules 171 apply to the email resources 165. In another embodiment, the access control service 174 may query the email services 1202 to determine whether any such resource rules 171 apply to the email resources 165. In yet another embodiment, the access control service 174 may query the client devices 120 to determine whether any such resource rules 171 apply to the email resources 165.

In any instance, the access control service 174 may analyze the state of the email resources 165 to determine whether the email resources 165 comply with the resource rules 171. In one embodiment, the access control service 174 may determine whether the email resources 165 are encrypted with at least one cryptographic key that is associated with the unauthorized applications. For example, the access control service 174 may determine whether the email resources 165 may be decrypted by the unauthorized applications. In another embodiment, the access control service 174 may determine whether the file format of the email resources 165 is associated with the unauthorized applications. For instance, the access control service 174 may determine whether the email resources 165 are formatted with a file extension that is readable by the unauthorized applications.

If the access control service 174 determines that the email resources 165 are not accessible via the unauthorized applications, the access control service 174 may proceed to step 1306. In particular, if the access control service 174 determines that the email resources 165 in their present state are inaccessible via the unauthorized applications, then the access control service 174 may refrain from modifying the email resources 165. If, however, the access control service 174 determines that the email resources 165 may be accessible via the unauthorized applications, then the access control service 174 may proceed to step 1308 to prevent the email resources 165 from being accessible via the unauthorized applications on the client devices 120. In certain embodiments, the access control service 174 may modify the email resources 165 to prevent the email resources 165 from being accessible via the unauthorized applications.

In some embodiments, the access control service 174 may encrypt the email resources 165 based on at least one cryptographic key to prevent the unauthorized applications from accessing the email resources 165. For example, the email resources 165 may be encrypted by the access control service 174 based at least in part on a cryptographic key that is foreign to the unauthorized applications, thereby preventing the unauthorized applications from decrypting and accessing the email resources 165. In one embodiment, the email resources 165 may be encrypted by the access control service 174 based at least in part on the advanced encryption standard (AES) cryptographic schema. In another embodiment, the email resources 165 may be encrypted by the access control service 174 based at least in part on the data encryption standard (AES) cryptographic schema. In any instance, the email resources 165 may be encrypted, and/or obfuscated, by the access control service 174 in a manner that prevents the unauthorized applications on the client devices 120 from presenting at least one user of the client devices 120 with a human-readable version of the email resources 165.

In other embodiments, the access control service 174 may modify the file format of the email resources 165 to prevent the unauthorized applications from accessing the email resources 165. For instance, the format of the file extension of the email resources 165 may be changed by the access control service 174 to a format that is foreign to the unauthorized applications, thereby preventing the unauthorized applications from interpreting and accessing the email resources 165. Thus, if the unauthorized applications are incapable of reading files that are formatted with the ".pdf" file extension, the access control service 174 may change the format of email resources 165 to the ".pdf" file extension to prevent the unauthorized applications from interpreting and accessing the email resources 165.

Additionally, the access control service 174 may determine whether the email resources 165 may be accessible on the client devices 120 via at least one authorized application on the client devices 120. In certain embodiments, at least one resource rule 171 may specify that the client devices 120 are authorized to access the email resources 165 via certain authorized applications on the client devices 120. In some embodiments, the resource rules 171 may specify a listing of applications that are authorized to access the email resources 165 on the client devices 120. In one embodiment, the access control service 174 may query the data store 153 of the access control server 150 to determine whether any such resource rules 171 apply to the email resources 165. In another embodiment, the access control service 174 may query the email services 1202 to determine whether any such resource rules 171 apply to the email resources 165. In yet another embodiment, the access control service 174 may query the client devices 120 to determine whether any such resource rules 171 apply to the email resources 165.

In any instance, the access control service 174 may analyze the state of the email resources 165 to determine whether the email resources 165 comply with the resource rules 171. In one embodiment, the access control service 174 may determine whether the email resources 165 are encrypted with at least one cryptographic key that is associated with the authorized applications. For example, the access control service 174 may determine whether the email resources 165 may be decrypted by the authorized applications. In another embodiment, the access control service 174 may determine whether the file format of the email resources 165 is associated with the authorized applications. For instance, the access control service 174 may determine whether the email resources 165 are formatted with a file extension that is readable by the authorized applications.

If the access control service 174 determines that the email resources 165 are accessible via the authorized applications, the access control service 174 may refrain from modifying the email resources 165. If, however, the access control service 174 determines that the email resources 165 are not accessible via the authorized applications, then the access control service 174 may enable the email resources 165 to be accessible via the authorized applications on the client devices 120. In certain embodiments, the access control service 174 may modify the email resources 165 to permit the email resources 165 to be accessible via the authorized applications.

In some embodiments, the access control service 174 may encrypt the email resources 165 based on at least one cryptographic key to enable the authorized applications to access the email resources 165. For example, the email resources 165 may be encrypted by the access control service 174 based at least in part on a cryptographic key that is native to the authorized applications, thereby enabling the authorized applications to decrypt and access the email resources 165. In one embodiment, the email resources 165 may be encrypted by the access control service 174 based at least in part on the advanced encryption standard (AES)

cryptographic schema. In another embodiment, the email resources 165 may be encrypted by the access control service 174 based at least in part on the data encryption standard (AES) cryptographic schema. In any instance, the email resources 165 may be encrypted, and/or obfuscated, by the access control service 174 in a manner that enables the authorized applications to present at least one user of the client devices 120 with a human-readable version of the email resources 165.

In other embodiments, the access control service 174 may modify the file format of the email resources 165 to enable the authorized applications to access the email resources 165. For instance, the format of the file extension of the email resources 165 may be changed to a format that is native to the authorized applications, thereby enabling the authorized applications to interpret and access the email resources 165. Thus, if the authorized applications are capable of reading files that are formatted with the ".pdf" file extension, the access control service 174 may change the format of email resources 165 to the ".pdf" file extension to enable the authorized applications to interpret and access the email resources 165.

Furthermore, the access control service 174 may authorize the client devices 120 to access the email resources 165. In certain embodiments, the access control service 174 may be configured to transmit at least one email resource 165 to the client devices 120. In one embodiment, the access control service 174 may transmit at least one email resource 165 to the client devices 120 that has been modified to be inaccessible by the client devices 120 via at least one unauthorized application on the client devices 120 and/or has been modified to be accessible by the client devices 120 via at least one authorized application on the client devices 120. In another embodiment, the access control service 174 may transmit at least one email resource 165 to the client devices 120 that has been modified to be accessible by the client devices 120 via at least one authorized application on the client devices 120 and/or that has been modified to be accessible by the client devices 120 via at least one authorized application on the client devices 120.

In some embodiments, the access control service 174 may be further configured to transmit at least one instruction to at least one client side application 126 on the client devices 120 that specifies the manner in which the client side applications 126 are authorized to access the email resources 165. In one embodiment, the instructions may specify and/or include at least one resource rule 171, as described herein. In another embodiment, the instructions may include at least one cryptographic key that may be used by the client side applications 126 to decrypt and access the email resources 165.

Figure 14:
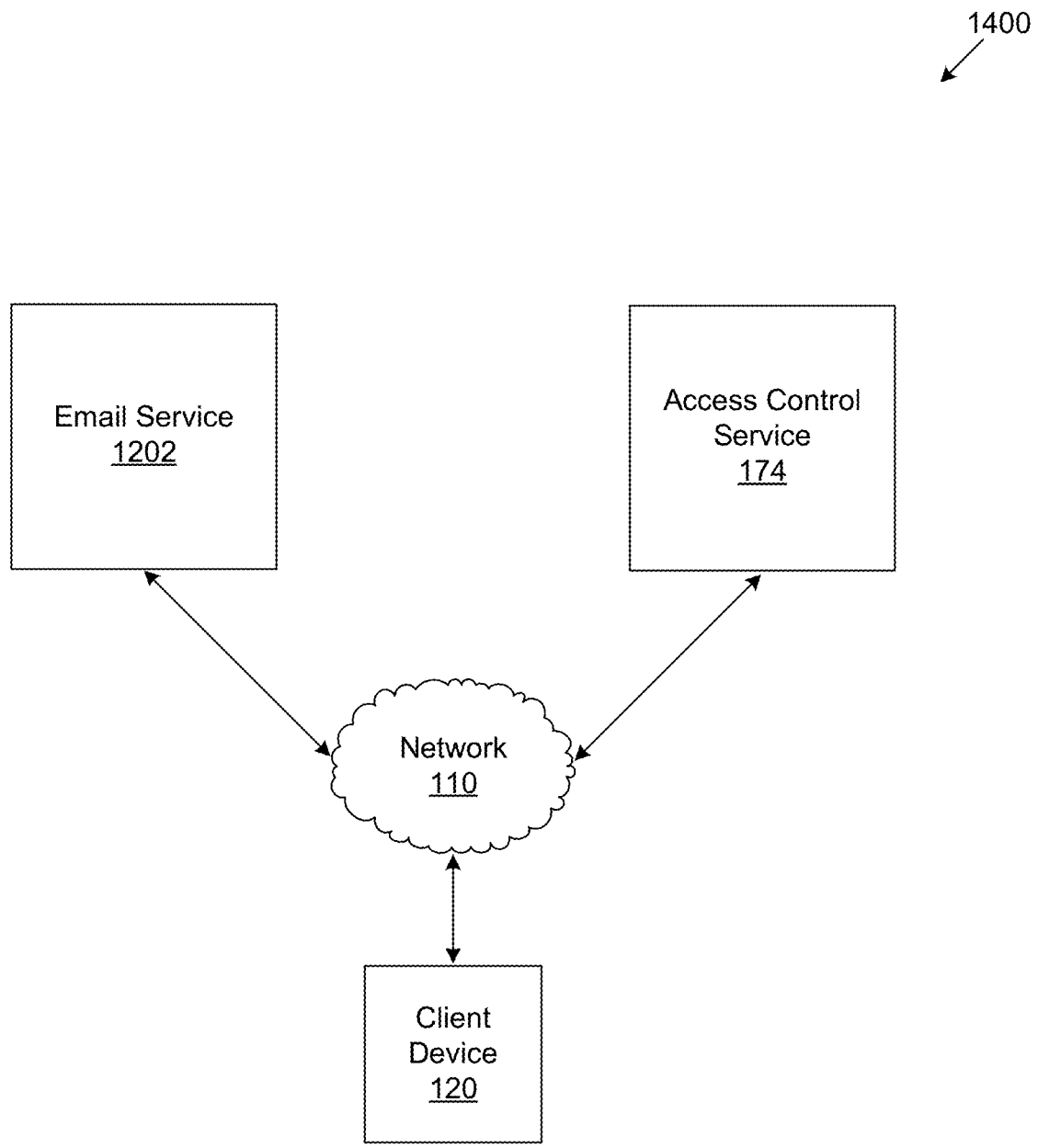
FIG. 14 illustrates a block diagram of a networked environment according to certain embodiments of the disclosure.

FIG. 14 depicts certain illustrative components for a networked environment 1400 according to various embodiments. In certain embodiments, the networked environment 100 may include at least one network 110, at least one client device 120, an access control service 174, and at least one email service 1202. The networked environment 1400 may be similar to the networked environment 1200 in FIG. 12. While the networked environment 1200 may include the same components as the networked environment 1400, the organization of the components of the two networked environment may differ as shown. In particular, the email services 1202 in the networked environment 1400 may communicate directly with the client devices 120, whereas the access control service 174 in the networked environment 1200 must relay all communications between the email services 1202 and client devices 120. The access control service 174 of the networked environment 1400 may be configured to determine which email resources 165 associated with the email services 1202 may be accessed by the client devices 120, control the manner in which the client devices 120 are authorized to access the email resources 165, and may provide the client devices 120 with access to the email resources 165.

In certain embodiments, the access control service 174 may determine which email resources 165 associated with the email services 1202 may be accessed by the client devices 120 by configuring the email services 1202. In some embodiments, the access control service 174 may transmit at least one instruction to the email services 1202 that configures the functionality of the email services 1202. As an example, the access control service 174 may utilize an instruction protocol, such as Microsoft PowerShell, to transmit the instructions to an email service 1202, such as a Microsoft Exchange Server. In one embodiment, the instructions may specify that the email resources 165 may be accessed by certain authorized applications on the client devices 120 and may not be accessed by certain unauthorized applications on the client devices 120. In another embodiment, the instructions may include at least one cryptographic key and/or file format with which the associated email resources 165 must be modified before the client devices 120 are authorized to access the email resources 165, as described herein. In any instance, the instructions may represent and/or specify at least one resource rule 171 (FIG. 1) associated with the email resources 165 that must be satisfied in order for the client devices 120 to be authorized to access the email resources 165, as described herein. Upon receiving the instructions from the access control service 174, the email services 1202 may execute the instructions on behalf of the access control service 174. Consequently, while the access control service 174 may not have any direct control over the email resources 165 in the networked environment 1400, the access control service 174 may nevertheless ensure that the email resources 165 are configured in accordance with certain specifications by remotely configuring the functionality of the email services 1202.

Similarly, in certain embodiments, the access control service 174 may determine which email resources 165 associated with the email services 1202 may be accessed by the client devices 120 by configuring at least one client side application 126 on the client devices 120. For instance, the access control service 174 may be associated with a "containerized" client side application 126 on the client devices 120 that is configured to receive at least one email resource 165 from the email services 1202 and control the manner in which other applications on the client devices 120 access the email resources 165 in accordance with instructions from the access control service 174. As described herein, the instructions may represent at least one resource rule 171 that specifies that the email resources 165 may be accessed by certain authorized applications on the client devices 120 and may not be accessed by certain unauthorized applications on the client devices 120, and may include at least one cryptographic key and/or file format with which the email resources 165 must be modified before the client devices 120 are authorized to access the email resources 165.

Upon receiving the instructions from the access control service 174, the client side applications 126 may execute the instructions on behalf of the access control service 174. In one embodiment, the client side application 126 may encrypt the email resources 165 based on at least one cryptographic key to prevent the email resources 165 from being accessible by unauthorized applications on the client device 120. In another embodiment, the client side application 126 may encrypt the email resources 165 based on at least one cryptographic key to enable the email resources 165 to be accessible by authorized applications on the client device 120. In yet another embodiment, the client side application 126 may transmit at least one cryptographic key used to encrypt the email resources 165 to at least one authorized application on the client device 120 to enable the authorized applications to access the email resources 165. Thus, while the access control service 174 may not have any direct control over the email resources 165 in the networked environment 1400, the access control service 174 may nevertheless ensure that the email resources 165 are configured in accordance with certain specifications by remotely configuring the functionality of the client side applications 126 on the client devices 120.

Figure 15:
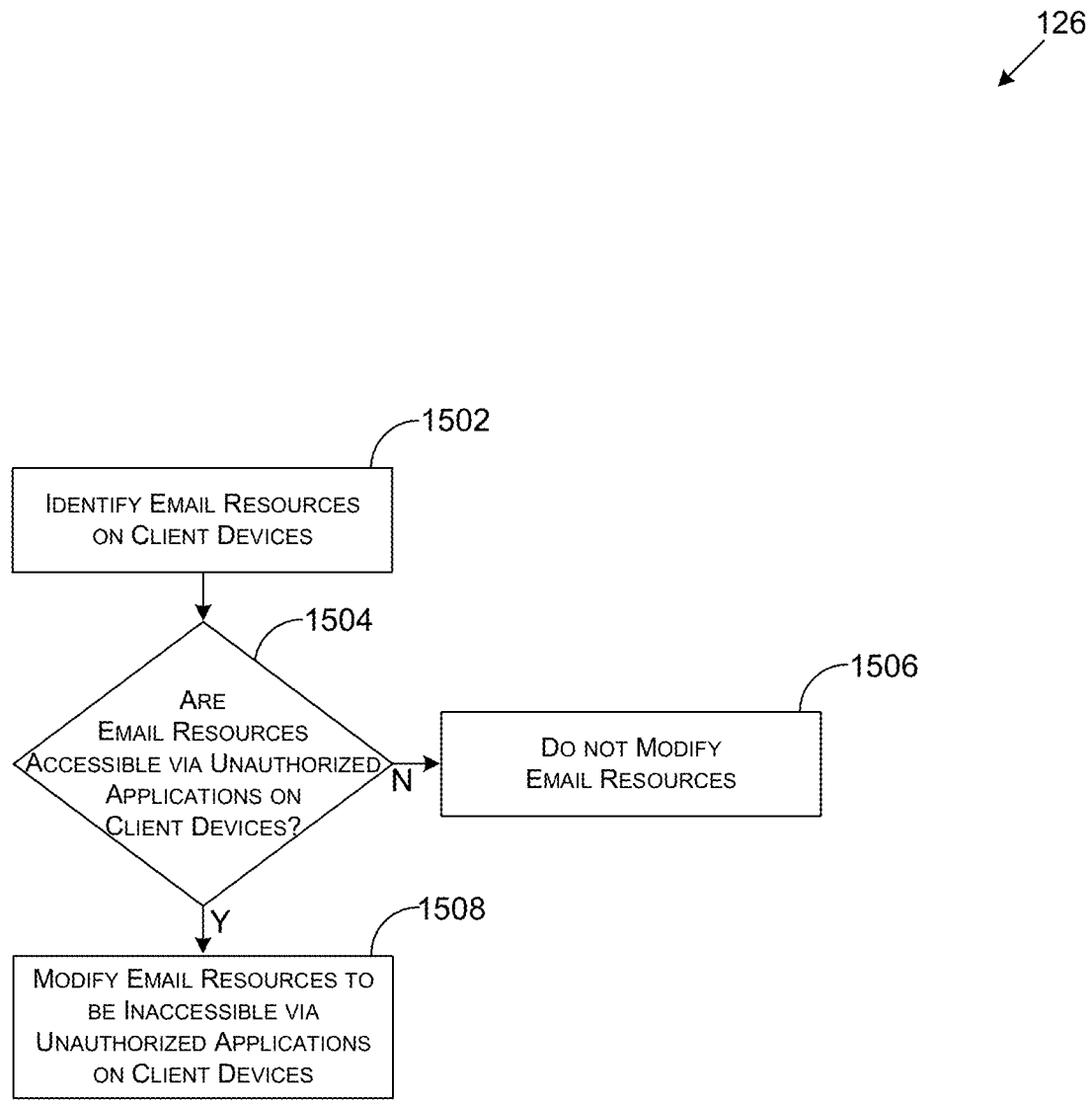
FIG. 15 illustrates a flow diagram of exemplary functionality performed by an access control service executed by an access control server in the networked environment of FIG. 14 according to certain embodiments of the present disclosure.

FIG. 15 is a flowchart illustrating exemplary functionality performed by a client side application 126 executed by a client device 120 (FIG. 1) according to certain embodiments. It is understood that the flowchart of FIG. 15 provides merely an example of the many different types of functional arrangements that may be employed to implement the operation of the client side application 126 as described herein. As an alternative, the flowchart of FIG. 15 may be viewed as depicting an example of steps of a method implemented in the client device 120 according to at least one embodiment.

Beginning with step 1502, the client side application 126 may identify at least one email resource 165 (FIG. 1) on the client device 120. In one embodiment, the client side application 126 may be configured to identify email resources 165 on the client device 120 by querying the data store 122 (FIG. 1) of the client device 120 to determine whether the data store 122 contains any email resources 165. In another embodiment, the client side application 126 may be configured to identify email resources 165 on the client device 120 by receiving at least one transmission of the email resources 165 from at least one access control service 174 (FIGS. 1,12,14) and/or at least one email service 1202 (FIGS. 12,14), as described herein. In yet another embodiment, the client side application 126 may be configured to identify email resources 165 on the client device 120 by determining whether other applications on the client device 120 have access to at least one email resource 165.

Next, in step 1504, the client side application 126 may determine whether the email resources 165 are accessible to the client devices 120 via at least one unauthorized application on the client devices 120. In certain embodiments, at least one resource rule 171 (FIG. 1) may specify that the client devices 120 are not authorized to access the email resources 165 via certain unauthorized applications on the client devices 120. In some embodiments, the resource rules 171 may specify a listing of applications that are not authorized to access the email resources 165 on the client devices 120. In one embodiment, the client side application 126 may query the data store 122 of the client device 120 to determine whether any such resource rules 171 apply to the email resources 165. In another embodiment, the client side application 126 may query at least one access control service 174 and/or at least one email service 1202 associated with the email resources 165 to determine whether any such resource rules 171 apply to the email resources 165. For instance, the client side application 126 may query the access control service 174 and/or email service 1202 from which the client side application 126 received a transmission of email resources 165 to determine whether resource rules 171 apply to such email resources 165.

In any instance, the client side application 126 may analyze the state of the email resources 165 to determine whether the email resources 165 comply with the resource rules 171. In one embodiment, the client side application 126 may determine whether the email resources 165 are encrypted based at least in part on at least one cryptographic key that is associated with the unauthorized applications. For example, the client side application 126 may determine whether the email resources 165 may be decrypted by the unauthorized applications. In another embodiment, the client side application 126 may determine whether the file format of the email resources 165 is associated with the unauthorized applications. For instance, the client side application 126 may determine whether the email resources 165 are formatted with a file extension that is readable by the unauthorized applications.

If the client side application 126 determines that the email resources 165 are not accessible via the unauthorized applications, the client side application 126 may proceed to step 1506. In particular, if the client side application 126 determines that the email resources 165 in their present state are inaccessible via the unauthorized applications, then the client side application 126 may refrain from modifying the email resources 165. If, however, the client side application 126 determines that the email resources 165 may be accessible via the unauthorized applications, then the client side application 126 may proceed to step 1508 to prevent the email resources 165 from being accessible via the unauthorized applications on the client devices 120. In certain embodiments, the client side application 126 may modify the email resources 165 to prevent the email resources 165 from being accessible via the unauthorized applications.

In some embodiments, the client side application 126 may encrypt the email resources 165 based on at least one cryptographic key to prevent the unauthorized applications from accessing the email resources 165. For example, the email resources 165 may be encrypted by the client side application 126 based at least in part on a cryptographic key that is foreign to the unauthorized applications, thereby preventing the unauthorized applications from decrypting and accessing the email resources 165. In one embodiment, the email resources 165 may be encrypted by the client side application 126 based at least in part on the advanced encryption standard (AES) cryptographic schema. In another embodiment, the email resources 165 may be encrypted by the client side application 126 based at least in part on the data encryption standard (AES) cryptographic schema. In any instance, the email resources 165 may be encrypted, and/or obfuscated, by the client side application 126 in a manner that prevents the unauthorized applications from presenting at least one user of the client devices 120 with a human-readable version of the email resources 165.

In other embodiments, the client side application 126 may modify the file format of the email resources 165 to prevent the unauthorized applications from accessing the email resources 165. For instance, the format of the file extension of the email resources 165 may be changed by the client side application 126 to a format that is foreign to the unauthorized applications, thereby preventing the unauthorized applications from interpreting and accessing the email resources 165. Thus, if the unauthorized applications are incapable of reading files that are formatted with the ".pdf" file extension, the client side application 126 may change the format of email resources 165 to the ".pdf" file extension to prevent the unauthorized applications from interpreting and accessing the email resources 165.

Additionally, the client side application 126 may determine whether the email resources 165 may be accessible on the client devices 120 via at least one authorized application on the client devices 120. In certain embodiments, at least one resource rule 171 may specify that the client devices 120 are authorized to access the email resources 165 via certain authorized applications on the client devices 120. In some embodiments, the resource rules 171 may specify a listing of applications that are authorized to access the email resources 165 on the client devices 120. In one embodiment, the client side application 126 may query the data store 122 of the client device 120 to determine whether any such resource rules 171 apply to the email resources 165. In another embodiment, the client side application 126 may query at least one access control service 174 and/or at least one email service 1202 associated with the email resources 165 to determine whether any such resource rules 171 apply to the email resources 165. For instance, the client side application 126 may query the access control service 174 and/or email service 1202 from which the client side application 126 received a transmission of email resources 165 to determine whether resource rules 171 apply to such email resources 165.

In any instance, the client side application 126 may analyze the state of the email resources 165 to determine whether the email resources 165 comply with the resource rules 171. In one embodiment, the client side application 126 may determine whether the email resources 165 are encrypted based on at least one cryptographic key that is associated with the authorized applications. For example, the client side application 126 may determine whether the email resources 165 may be decrypted by the authorized applications. In another embodiment, the client side application 126 may determine whether the file format of the email resources 165 is associated with the authorized applications. For instance, the client side application 126 may determine whether the email resources 165 are formatted with a file extension that is readable by the authorized applications.

If the client side application 126 determines that the email resources 165 are accessible via the authorized applications, the client side application 126 may refrain from modifying the email resources 165. If, however, the client side application 126 determines that the email resources 165 are not accessible via the authorized applications, then the client side application 126 may enable the email resources 165 to be accessible via the authorized applications on the client devices 120. In certain embodiments, the client side application 126 may modify the email resources 165 to permit the email resources 165 to be accessible via the authorized applications.

In some embodiments, the client side application 126 may encrypt the email resources 165 based on at least one cryptographic key to enable the authorized applications to access the email resources 165. For example, the email resources 165 may be encrypted by the client side application 126 based at least in part on a cryptographic key that is native to the authorized applications, thereby enabling the authorized applications to decrypt and access the email resources 165. In one embodiment, the email resources 165 may be encrypted by the client side application 126 based at least in part on the advanced encryption standard (AES) cryptographic schema. In another embodiment, the email resources 165 may be encrypted by the client side application 126 based at least in part on the data encryption standard (AES) cryptographic schema. In any instance, the email resources 165 may be encrypted, and/or obfuscated, by the client side application 126 in a manner that enables the authorized applications to present at least one user of the client devices 120 with a human-readable version of the email resources 165.

In other embodiments, the client side application 126 may modify the file format of the email resources 165 to enable the authorized applications to access the email resources 165. For instance, the format of the file extension of the email resources 165 may be changed by the client side application 126 to a format that is native to the authorized applications, thereby enabling the authorized applications to interpret and access the email resources 165. Thus, if the authorized applications are capable of reading files that are formatted with the ".pdf" file extension, the client side application 126 may change the format of email resources 165 to the ".pdf" file extension to enable the authorized applications to interpret and access the email resources 165.

Furthermore, the client side application 126 may authorize the client device 120 to access the email resources 165. In certain embodiments, the client side application 126 may be configured to transmit at least one email resource 165 to at least one other application on the client device 120. In one embodiment, the client side application 126 may transmit at least one email resource 165 to at least one other application on the client device 120 that has been modified to be inaccessible by the client device 120 via at least one unauthorized application on the client device 120 and/or has been modified to be accessible by the client device 120 via at least one authorized application on the client device 120. In another embodiment, the client side application 126 may transmit at least one email resource 165 to at least one other application on the client device 120 that has been modified to be accessible by the client device 120 via at least one authorized application on the client device 120 and/or has been modified to be accessible by the client device 120 via at least one authorized application on the client device 120. In yet another embodiment, the client side application 126 may transmit at least one email resource 165 to the data store 122 of the client device 120 has been modified to be inaccessible by the client device 120 via at least one unauthorized application on the client device 120 and/or has been modified to be accessible by the client device 120 via at least one authorized application on the client device 120.

In some embodiments, the client side application 126 may be further configured to transmit at least one instruction to at least one other application on the client device 120 that specifies the manner in which the applications are authorized to access the email resources 165. In one embodiment, the instructions may specify and/or include at least one resource rule 171, as described herein. In another embodiment, the instructions may include at least one cryptographic key that may be used by the applications to decrypt and access the email resources 165.

Figure 16:
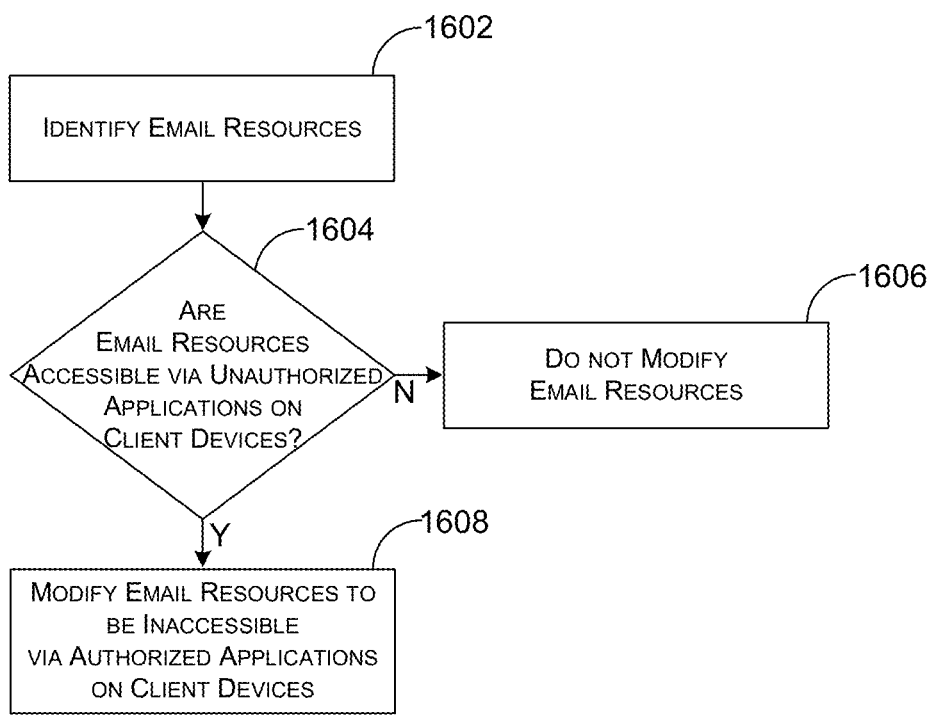
FIG. 16 illustrates a flow diagram of exemplary functionality performed by a client side application executed by a client device in the networked environment of FIGS. 12 and 14 according to certain embodiments of the present disclosure.

FIG. 16 is a flowchart illustrating exemplary functionality performed by a computing system according to certain embodiments. For example, the computing system may be and/or include an access control service 174 executed by an access control server 150 (FIG. 1) and/or a client side application 126 executed by a client device 120 (FIG. 1), as described herein. It is understood that the flowchart of FIG. 16 provides merely an example of the many different types of functional arrangements that may be employed to implement the operation of the computer system as described herein. As an alternative, the flowchart of FIG. 16 may be viewed as depicting an example of steps of a method implemented in the computing system according to at least one embodiment.

Beginning with step 1602, the computing system may identify at least one email resource 165 (FIG. 1). In one embodiment, the computing system may identify email resources 165 by receiving the email resources 165 from an email service 1202 (FIGS. 12, 14), access control service 174, and/or client device 120 associated with the email resources 165. In another embodiment, the computing system may query the data stores of an email server, access control server 150, and/or client device 120 to determine whether the data stores hold email resources 165.

Next, in step 1604, the computing system may determine whether the email resources 165 are accessible to at least one client device 120 via at least one unauthorized application on the client devices 120. As described herein, at least one resource rule 171 (FIG. 1) may specify that client devices 120 are not authorized to access the email resources 165 via certain unauthorized applications on the client devices 120, which may include a listing of certain unauthorized applications. In certain embodiments, the computing system may receive at least one resource rule 171 associated with the email resources 165 from an email service 1202 (FIGS. 12, 14), access control service 174, and/or client device 120 associated with the email resources 165. In some embodiments, the computing system may query the data stores of an email service 1202 (FIGS. 12, 14), access control service 174, and/or client device 120 associated with the email resources 165 to determine whether the data stores hold resource rules 171 associated with the email resources 165.

In any instance, the computing system may analyze the state of the email resources 165 to determine whether the email resources 165 comply with the resource rules 171. In one embodiment, the computing system may determine whether the email resources 165 are encrypted based at least in part on at least one cryptographic key that is associated with the unauthorized applications, which may determine whether the email resources 165 may be decrypted by the unauthorized applications. In another embodiment, the computing system may determine whether the file format of the email resources 165 is associated with the unauthorized applications, which may determine whether the email resources 165 are formatted with a file extension that is readable by the unauthorized applications.

If the computing system determines that the email resources 165 are not accessible via the unauthorized applications, the computing system may proceed to step 1606. In particular, if the computing system determines that the email resources 165 in their present state are inaccessible via the unauthorized applications on client devices 120, then the computing system may refrain from modifying the email resources 165. If, however, the computing system determines that the email resources 165 may be accessible via the unauthorized applications on client devices 120, then the computing system may proceed to step 1608 to prevent the email resources 165 from being accessible via the unauthorized applications on the client devices 120.

In certain embodiments, the computing system may modify the email resources 165 to prevent the email resources 165 from being accessible via the unauthorized applications on the client devices 120. In some embodiments, the computing system may encrypt the email resources 165 based on at least one cryptographic key to prevent the unauthorized applications from accessing the email resources 165, such as a cryptographic key that is foreign to the unauthorized applications to prevent the unauthorized applications from decrypting and accessing the email resources 165. For instance, the email resources 165 may be encrypted by the computing system based at least in part on the advanced encryption standard (AES) cryptographic schema and/or the data encryption standard (AES) cryptographic schema. In any instance, the email resources 165 may be encrypted, and/or obfuscated, by the computing system in a manner that prevents the unauthorized applications from presenting at least one user of the client devices 120 with a human-readable version of the email resources 165. In other embodiments, the computing system may modify the file format of the email resources 165 to prevent the unauthorized applications on the client devices 120 from accessing the email resources 165. For instance, the format of the file extension of the email resources 165 may be changed by the computing system to a format that is foreign to the unauthorized applications, thereby preventing the unauthorized applications from interpreting and accessing the email resources 165.

Additionally, the computing system may determine whether the email resources 165 may be accessible on the client devices 120 via at least one authorized application on the client devices 120. As described herein, at least one resource rule 171 may specify that the client devices 120 are authorized to access the email resources 165 via certain authorized applications on the client devices 120, which may include a listing of applications that are authorized to access the email resources 165 on the client devices 120. Consequently, the computing system may analyze the state of the email resources 165 to determine whether the email resources 165 comply with the resource rules 171. In one embodiment, the computing system may determine whether the email resources 165 are encrypted based at least in part on at least one cryptographic key that is associated with the authorized applications, which may determine whether the email resources 165 may be decrypted by the authorized applications. In another embodiment, the computing system may determine whether the file format of the email resources 165 is associated with the authorized applications, which may determine whether the email resources 165 are formatted with a file extension that is readable by the authorized applications.

If the computing system determines that the email resources 165 are accessible via the authorized applications, the computing system may refrain from modifying the email resources 165. If, however, the computing system determines that the email resources 165 are not accessible via the authorized applications, then the computing system may enable the email resources 165 to be accessible via the authorized applications on the client devices 120.

In certain embodiments, the computing system may modify the email resources 165 to permit the email resources 165 to be accessible via the authorized applications on the client devices 120. In some embodiments, the computing system may encrypt the email resources 165 based on at least one cryptographic key to enable the authorized applications to access the email resources 165, such as with a cryptographic key that is native to the authorized applications that enables the authorized applications to decrypt and access the email resources 165. In other embodiments, the computing system may modify the file format of the email resources 165 to enable the unauthorized applications on the client devices 120 to access the email resources 165, such as to a format that is native to the authorized applications to prevent the authorized applications to interpret and access the email resources 165.

Furthermore, the computing system may authorize the client devices 120 to access the email resources 165. In certain embodiments, the computing system may be configured to transmit at least one email resource 165 to the client devices 120, such as email resources 165 that have been modified to be inaccessible by the client devices 120 via at least one unauthorized application on the client devices 120 and/or have been modified to be accessible by the client devices 120 via at least one authorized application on the client devices 120. In some embodiments, the computing system may be further configured to transmit at least one instruction to at least one client side application 126 on the client devices 120 that specifies the manner in which the client side applications 126 are authorized to access the email resources 165, which may include at least one resource rule 171 and/or at least one cryptographic key that may be used by the client side applications 126 to decrypt and access the email resources 165 on the client devices 120 as described herein.

Figure 17:
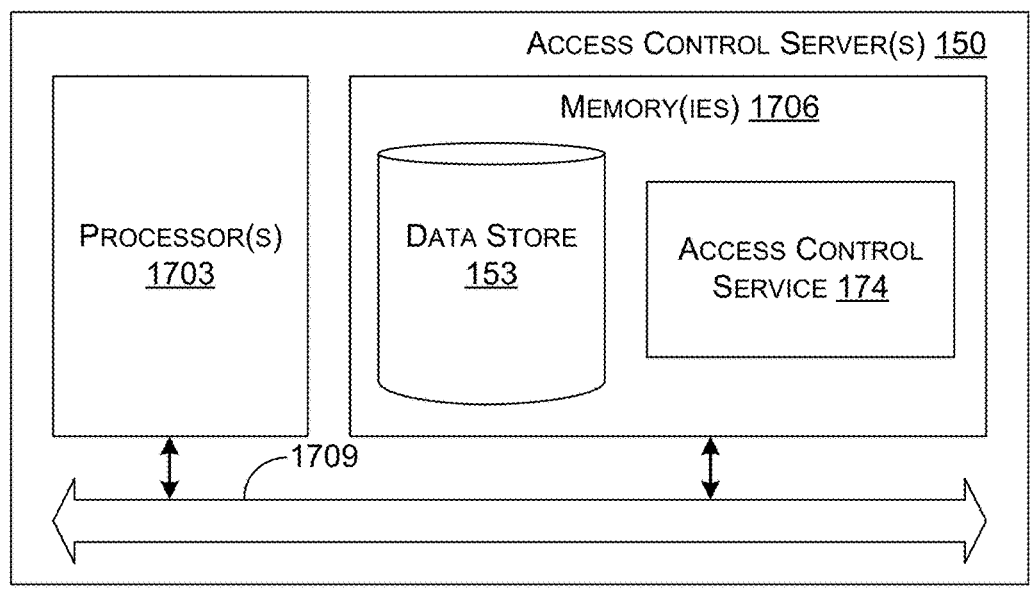
FIG. 17 illustrates schematic block diagrams of an access control server and a client device employed in the network environments of FIGS. 1, 12 and 14 according to certain embodiments of the disclosure.
Figure 17:
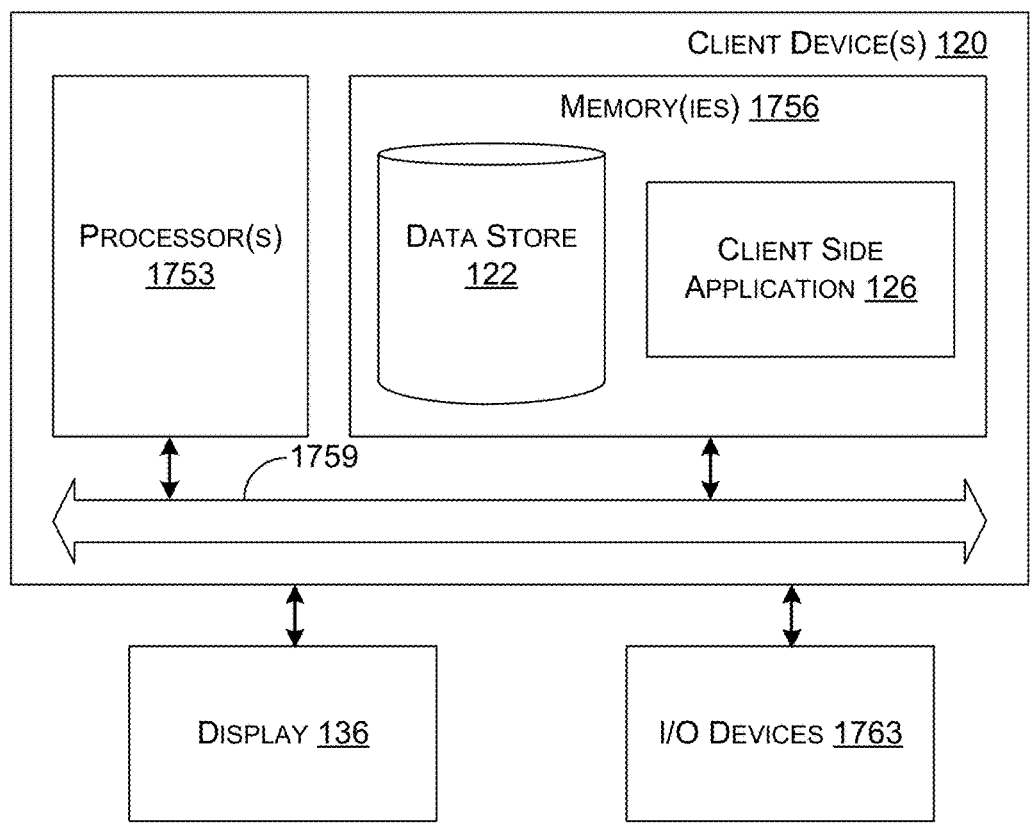

FIG. 17 shows schematic block diagrams of an exemplary access control server 150 and an exemplary client device 120 according to an embodiment of the present disclosure. The access control server 150 includes at least one processor circuit, for example, having a processor 1703 and a memory 1706, both of which are coupled to a local interface 1709. To this end, the access control server 150 may comprise, for example, at least one server computer or like device. Similarly, the client device 120 includes at least one processor circuit, for example, having a processor 1753 and a memory 1756, both of which are coupled to a local interface 1759. Additionally, the client device 120 may be in data communication with a display 136 for rendering user interfaces 137 (FIG. 1) and at least one other I/O device 1763 for inputting and outputting data. To this end, the client device 120 may comprise, for example, at least one client computer or like device.

The following is a general discussion of the components of the access control server 150 and the client device 120. The local interface 1709 and 1759 may comprise, for example, a data bus with an accompanying address/control bus or other bus structure as can be appreciated. Stored in the memory 1706 and 1756 are both data and several components that are executable by the processors 1703 and 1753. In particular, with regard to the access control server 150, stored in the memory 1706 and executable by the processor 1703 are an access control service 174 and potentially other applications. Additionally, with regard to the client device 120, stored in the memory 1756 and executable by the processor 1753 are a client side application 126 and potentially other applications. Also stored in the memory 1706 and 1756 may be a data store 153 and 122 and other data. In addition, an operating system may be stored in the memory 1706 and 1756 and executable by the processor 1703 and 1753.

It is to be understood that there may be other applications that are stored in the memory 1706 and 1756 and are executable by the processor 1703 and 1753 as can be appreciated. Where any component discussed herein is implemented in the form of software, any one of a number of programming languages may be employed such as, for example, C, C++, C #, Objective C, Java, JavaScript, Perl, PHP, Visual Basic, Python, Ruby, Delphi, Flash, or other programming languages.

A number of software components are stored in the memory 1706 and 1756 and are executable by the processor 1703 and 1753. In this respect, the term "executable" means a program file that is in a form that can ultimately be run by the processor 1703 and 1753. Examples of executable programs may be, for example, a compiled program that can be translated into machine code in a format that can be loaded into a random access portion of the memory 1706 and 1756 and run by the processor 1703 and 1753, source code that may be expressed in proper format such as object code that is capable of being loaded into a random access portion of the memory 1706 and 1756 and executed by the processor 1703 and 1753, or source code that may be interpreted by another executable program to generate instructions in a random access portion of the memory 1706 and 1756 to be executed by the processor 1703 and 1753, etc. An executable program may be stored in any portion or component of the memory 1706 and 1756 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1706 and 1756 are defined herein as including both volatile and nonvolatile memory and data storage components. Volatile components are those that do not retain data values upon loss of power. Nonvolatile components are those that retain data upon a loss of power. Thus, the memory 1706 and 1756 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1703 and 1753 may represent multiple processors, and the memory 1706 and 1756 may represent multiple memories that operate in parallel processing circuits, respectively. In such a case, the local interface 1709 and 1759 may be an appropriate network 110 (FIG. 1) that facilitates communication between any two of the multiple processors 1703 and 1753, or between any two of the memory 1706 and 1756, etc. The local interface 1709 and 1759 may comprise additional systems designed to coordinate this communication, including, for example, performing load balancing. The processor 1703 and 1753 may be of electrical or of some other available construction.

Although the access control service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of at least one data signal, application specific integrated circuits having appropriate logic gates, or other components, etc. Such technologies are generally well known by those skilled in the art and, consequently, are not described in detail herein.

The flowcharts of FIGS. 2, 3, 13 and 15 show certain functionality and operations performed by the access control service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1703 and 1753 in a computer system or other system. The machine code may be converted from the source code, etc. If embodied in hardware, each block may represent a circuit or a number of interconnected circuits to implement the specified logical function(s).

Although the flowcharts of FIGS. 2, 3, 13 and 15 show a specific order of execution, it is understood that the order of execution may differ from that which is depicted. For example, the order of execution of two or more steps may be scrambled relative to the order shown. Also, two or more blocks shown in succession in FIGS. 2, 3, 13 and 15 may be executed concurrently or with partial concurrence. Further, in some embodiments, at least one of the steps shown in FIGS. 2, 3, 13 and 15 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the access control service 174 and the client side application 126, that comprises software or code can be embodied in any non-transitory computer-readable medium for use by or in connection with an instruction execution system such as, for example, a processor 1703 and 1753 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method performed by an access control server to manage a client device's access to content associated with email messages provided by an email server, the access control server being configured to execute as a proxy between the email server and the client device for the email messages, the method comprising:
   obtaining from the email server, an email message for transmission to the client device;
   determining according to at least one resource rule including an access-type resource rule, to restrict the client device's access to the obtained email message based on a presence of an unauthorized application running on the client device that can access email messages transmitted to the client device;
   in response to determining to restrict the client device's access, encrypting at least a portion of the obtained email message to generate a modified email message, the at least a portion of the obtained email message comprising a body of the obtained email message, wherein an authorized application on the client device has a cryptographic key for decrypting the modified email message, the cryptographic key being inaccessible to the unauthorized application; and
   transmitting the modified email message to the client device.

2. The method of claim 1, further comprising:
   transmitting the cryptographic key to the authorized application to enable the authorized application to decrypt the modified email message.

3. The method of claim 1, wherein the at least one resource rule includes a content-type resource rule, the method further comprising:
   determining that text specified by the content-type resource rule is included in the obtained email message; and
   based on determining that the specified text is included, transmitting the modified email message to the client device using a secure transmission protocol.

4. The method of claim 1, wherein the at least one resource rule specifies as a credential for accessing the modified email message: a domain, a username, or an email address.

5. The method of claim 1, wherein the at least a portion of the obtained email message further comprises an email attachment, the method further comprising:
   encrypting the email attachment from the obtained email message to generate a modified attachment; and
   including the modified attachment as an attachment to the modified email message transmitted to the client device.

6. The method of claim 1, wherein the at least one resource rule includes a format-type resource rule specifying an encoding format, and wherein based on the format-type resource rule, the at least a portion of the obtained email message is encrypted according to the encoding format.

7. The method of claim 1, wherein the at least one resource rule includes an attachment-type resource rule, the method further comprising:
   based on the attachment-type resource rule, stripping an attachment from the obtained email message before generating the modified email message from the obtained email message.

8. A non-transitory computer-readable medium comprising a program which, when executed by a processor of an access control server that is configured to execute as a proxy between an email server and a client device that accesses content associated with email messages provided by the email server, causes the processor to at least:
  obtain from the email server, an email message for transmission to the client device;
  determine according to at least one resource rule including an access-type resource rule, to restrict the client device's access to the obtained email message based on a presence of an unauthorized application running on the client device that can access email messages transmitted to the client device;
  in response to determining to restrict the client device's access, encrypt at least a portion of the obtained email message to generate a modified email message, the at least a portion of the obtained email message comprising a body of the obtained email message, wherein an authorized application on the client device has a cryptographic key for decrypting the modified email message, the cryptographic key being inaccessible to the unauthorized application; and
  transmit the modified email message to the client device.

9. The non-transitory computer-readable medium of claim 8, wherein the program, when executed by the processor, further causes the processor to at least:
  transmit the cryptographic key to the authorized application to enable the authorized application to decrypt the modified email message.

10. The non-transitory computer-readable medium of claim 8, wherein the at least one resource rule includes a content-type resource rule, and wherein the program, when executed by the processor, further causes the processor to at least:
  determine that text specified by the content-type resource rule is included in the obtained email message; and
  based on determining that the specified text is included, transmit the modified email message to the client device using a secure transmission protocol.

11. The non-transitory computer-readable medium of claim 8, wherein the at least one resource rule specifies as a credential for accessing the modified email message: a domain, a username, or an email address.

12. The non-transitory computer-readable medium of claim 8, wherein the at least a portion of the obtained email message further comprises an email attachment, and wherein the program, when executed by the processor, further causes the processor to at least:
  encrypt the email attachment from the obtained email message to generate a modified attachment; and
  include the modified attachment as an attachment to the modified email message transmitted to the client device.

13. The non-transitory computer-readable medium of claim 8, wherein the at least one resource rule includes a format-type resource rule specifying an encoding format, and wherein based on the format-type resource rule, the at least a portion of the obtained email message is encrypted according to the encoding format.

14. The non-transitory computer-readable medium of claim 8, wherein the at least one resource rule includes an attachment-type resource rule, and wherein the program, when executed by the processor, further causes the processor to at least:
  based on the attachment-type resource rule, strip an attachment from the obtained email message before generating the modified email message from the obtained email message.

15. An access control server configured to execute as a proxy between an email server and a client device that accesses content associated with email messages provided by the email server, wherein the access control server includes a processor configured to execute instructions from a non-transitory computer-readable medium to at least:
  obtain from the email server, an email message for transmission to the client device;
  determine according to at least one resource rule including an access-type resource rule, to restrict the client device's access to the obtained email message based on a presence of an unauthorized application running on the client device that can access email messages transmitted to the client device;
  in response to determining to restrict the client device's access, encrypt at least a portion of the obtained email message to generate a modified email message, the at least a portion of the obtained email message comprising a body of the obtained email message, wherein an authorized application on the client device has a cryptographic key for decrypting the modified email message, the cryptographic key being inaccessible to the unauthorized application; and
  transmit the modified email message to the client device.

16. The access control server of claim 15, wherein the processor is further configured to execute the instructions from the non-transitory computer-readable medium to at least:
  transmit the cryptographic key to the authorized application to enable the authorized application to decrypt the modified email message.

17. The access control server of claim 15, wherein the at least one resource rule includes a content-type resource rule, and wherein the processor is further configured to execute the instructions from the non-transitory computer-readable medium to at least:
  determine that text specified by the content-type resource rule is included in the obtained email message; and
  based on determining that the specified text is included, transmit the modified email message to the client device using a secure transmission protocol.

18. The access control server of claim 15, wherein the at least a portion of the obtained email message further comprises an email attachment, and wherein the processor is further configured to execute the instructions from the non-transitory computer-readable medium to at least:
  encrypt the email attachment from the obtained email message to generate a modified attachment; and
  include the modified attachment as an attachment to the modified email message transmitted to the client device.

19. The access control server of claim 15, wherein the at least one resource rule includes a format-type resource rule specifying an encoding format, and wherein based on the format-type resource rule, the at least a portion of the obtained email message is encrypted according to the encoding format.

20. The access control server of claim 15, wherein the at least one resource rule includes an attachment-type resource rule, and wherein the processor is further configured to execute the instructions from the non-transitory computer-readable medium to at least:

based on the attachment-type resource rule, strip an attachment from the obtained email message before generating the modified email message from the obtained email message.

* * * * *